United States Patent [19]
van der Lely et al.

[11] 3,962,854
[45] June 15, 1976

[54] RAKE MACHINE

[76] Inventors: Cornelis van der Lely, 7, Bruschenrain, Zug, Switzerland; Ary van der Lely, 10, Weverskade, Maasland, Netherlands

[22] Filed: Oct. 11, 1974

[21] Appl. No.: 514,307

[30] Foreign Application Priority Data

| Oct. 12, 1973 | Netherlands | 7314028 |
| Jan. 18, 1974 | Netherlands | 7400685 |
| Feb. 18, 1974 | Netherlands | 7402172 |
| July 2, 1974 | Netherlands | 7407753 |
| June 19, 1974 | Netherlands | 7408181 |
| July 2, 1974 | Netherlands | 7408894 |
| Sept. 9, 1974 | Netherlands | 7411914 |

[52] U.S. Cl. ............................................. 56/370
[51] Int. Cl.² ...................................... A01D 79/02
[58] Field of Search .............. 56/365, 366, 370, 377

[56] References Cited
UNITED STATES PATENTS

3,579,972   5/1971   Seavs et al. ........................... 56/370

FOREIGN PATENTS OR APPLICATIONS

| 1,457,988 | 8/1965 | Germany | 56/370 |
| 2,006,684 | 2/1970 | Germany | 56/370 |

*Primary Examiner*—Russell R. Kinsey
*Attorney, Agent, or Firm*—Mason, Mason & Albright

[57] ABSTRACT

A rake device includes at least one rake member that rotates about an upwardly extending axis. The rake member has a hub and spokes that extend radially from the axis of rotation of the member. The outer circumference of the member is comprised of a circular wall made of flexible material. The outer wall is deformable in several directions to allow for ground deformations, and the lower part of the wall can have weights and/or pivotal connections to restrict the wall deformation. The spokes can be interconnected to the wall by flexible or resilient connections to allow for expansion due to centrifugal force when the rake member is rotated. Tines are connected to the wall, preferably around the lower skirt portion of the wall.

44 Claims, 55 Drawing Figures

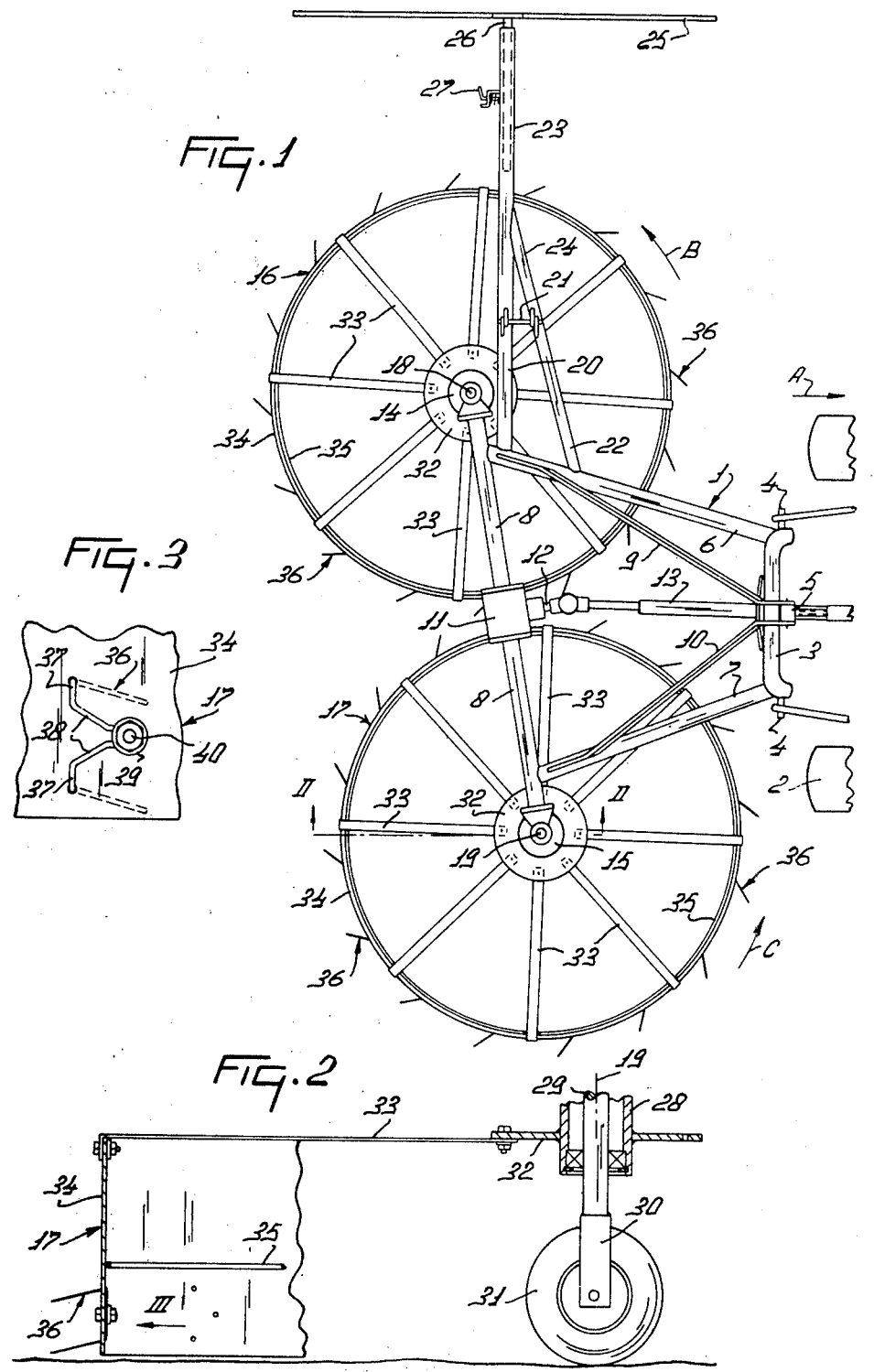

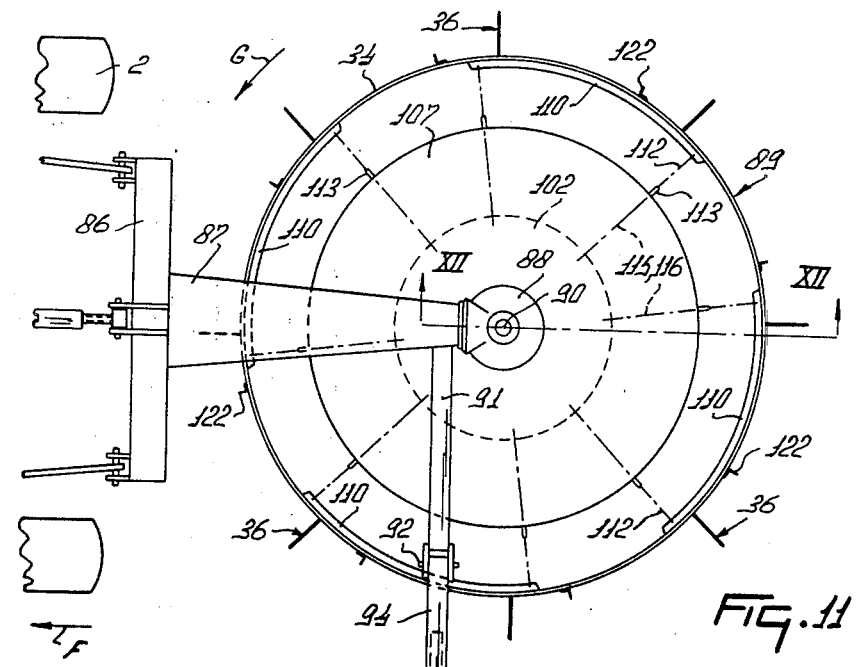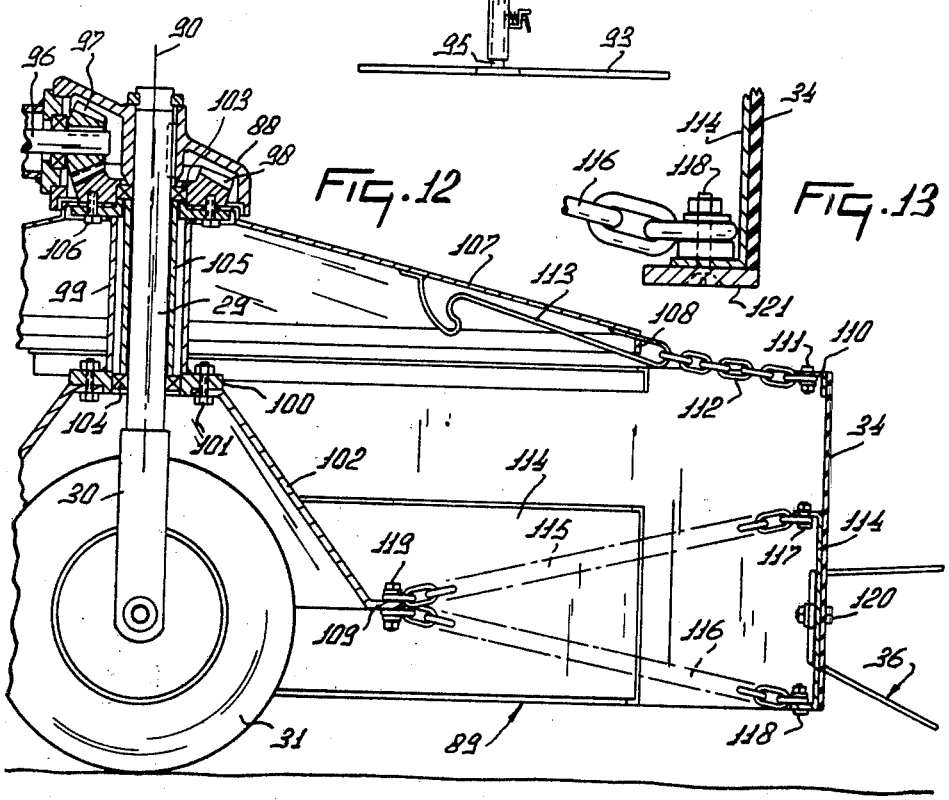

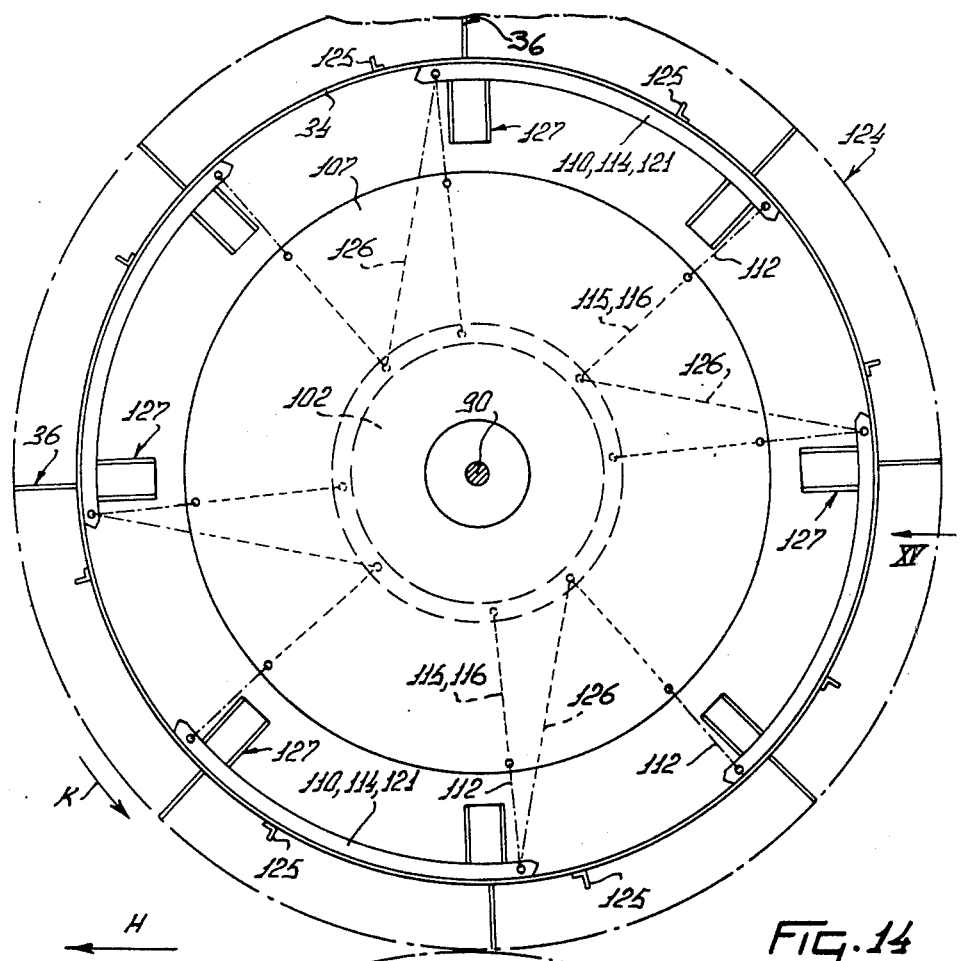
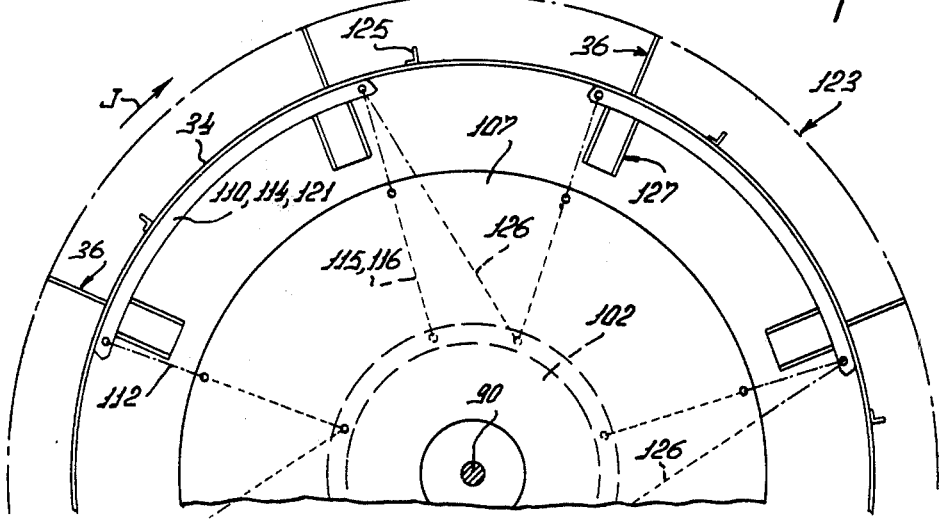
FIG.14

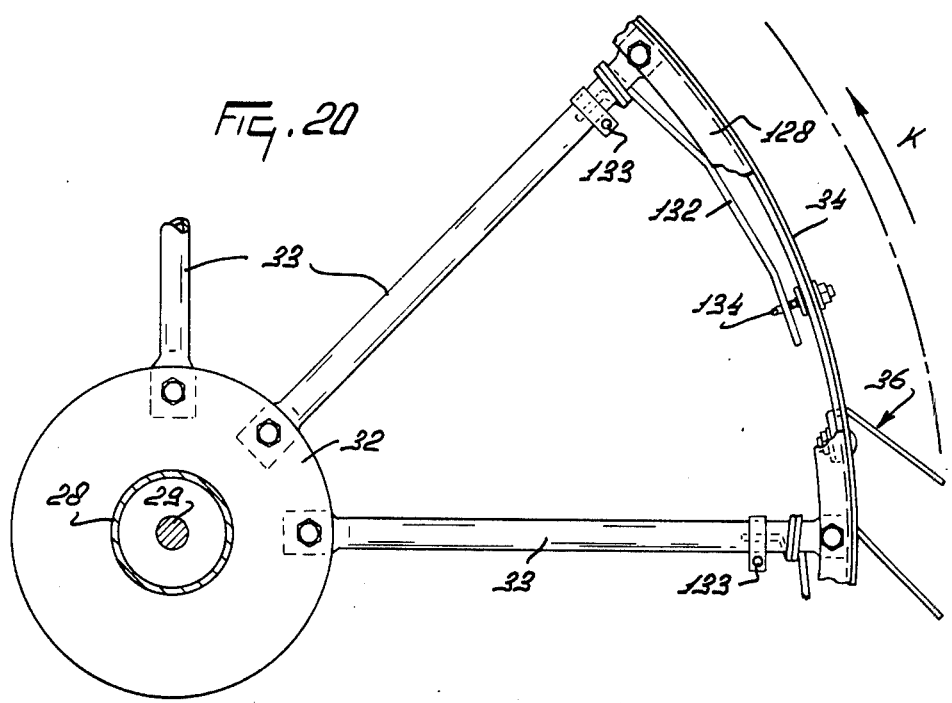
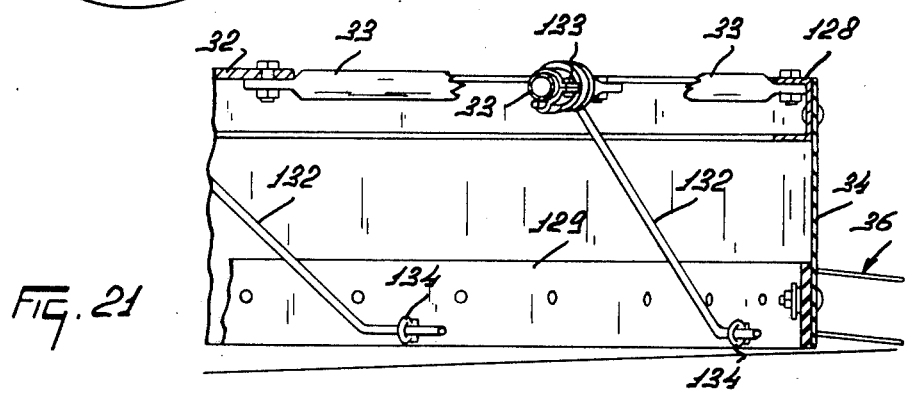
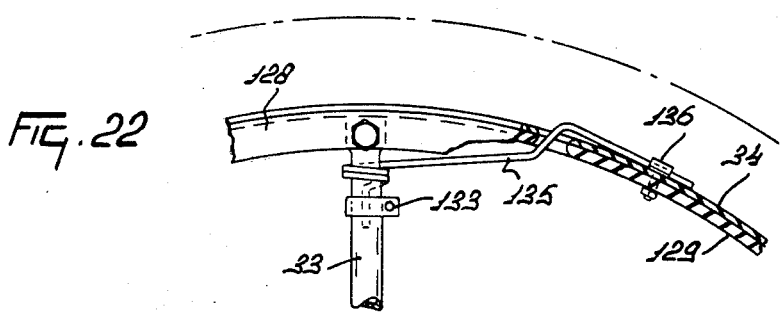

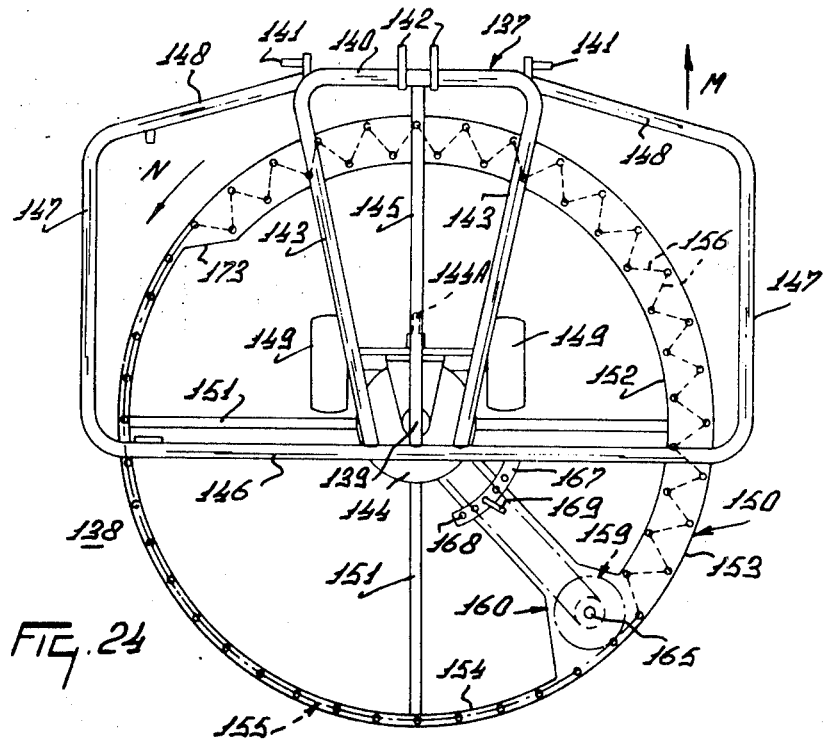
FIG. 24
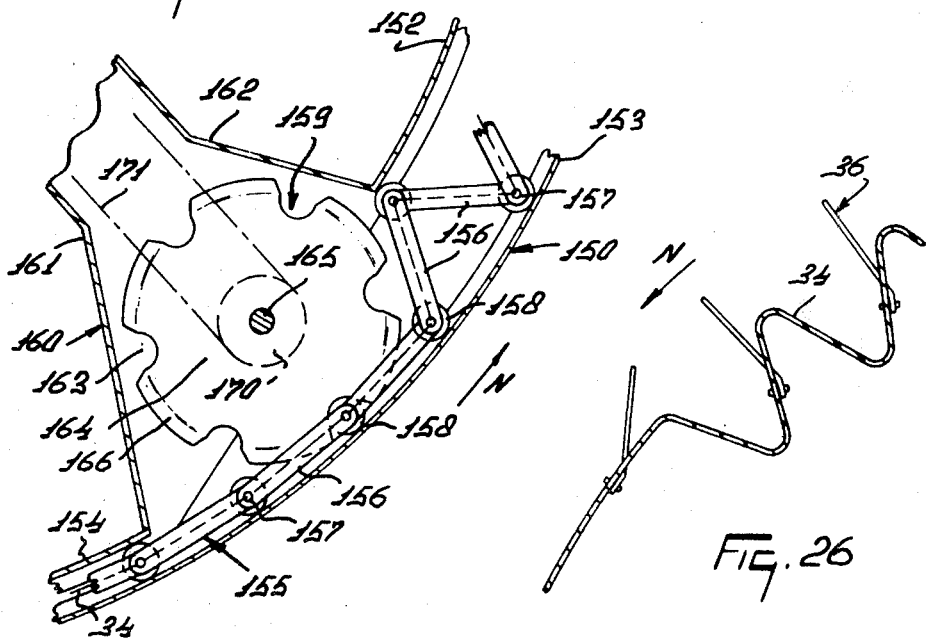
FIG. 25
FIG. 26

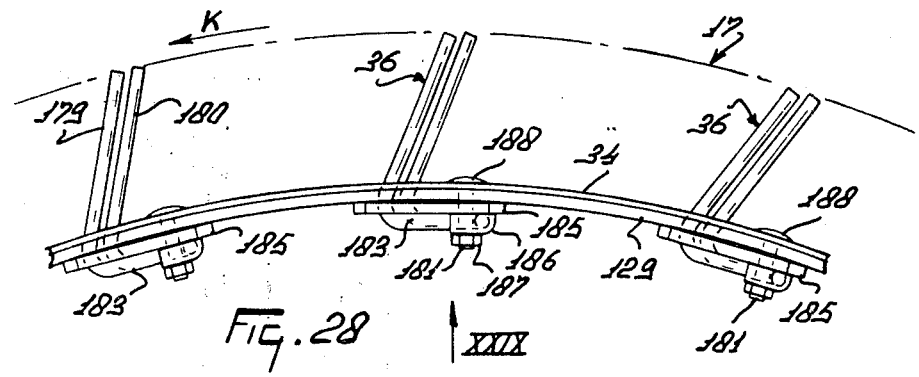
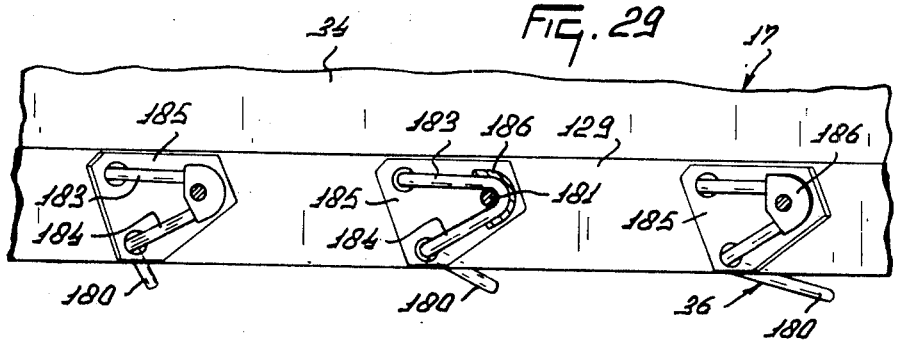
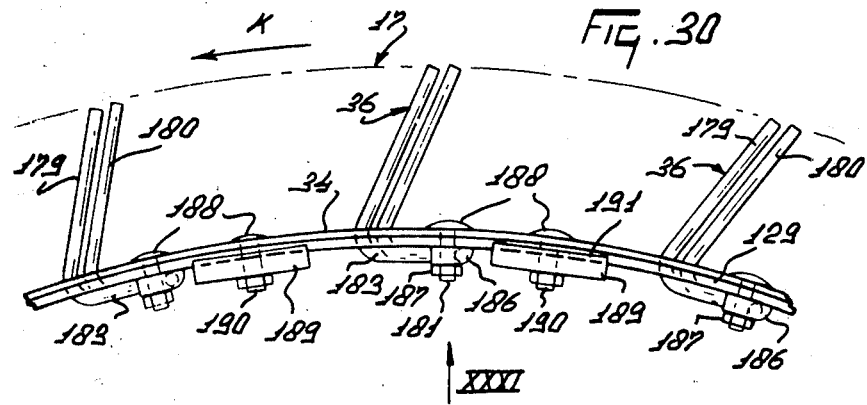
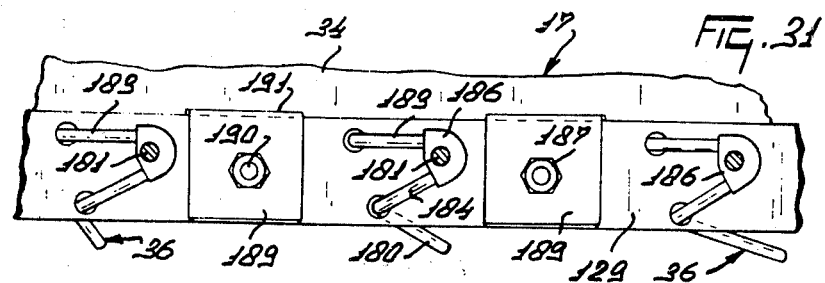

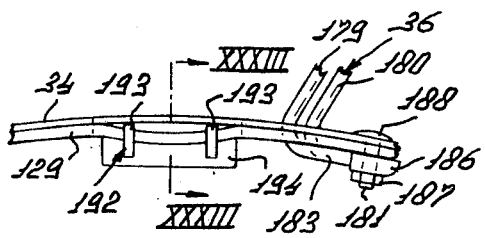
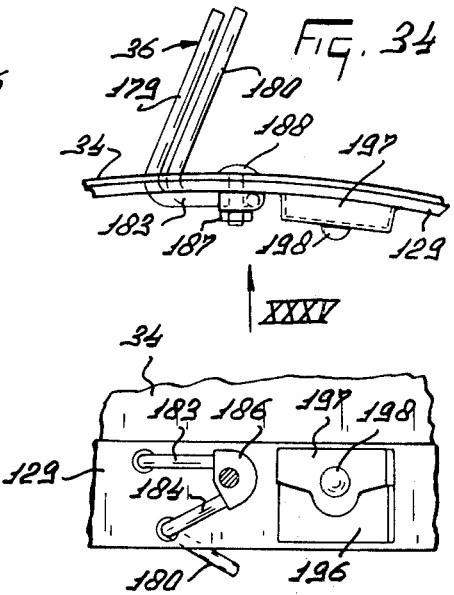
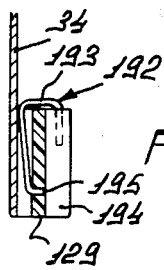
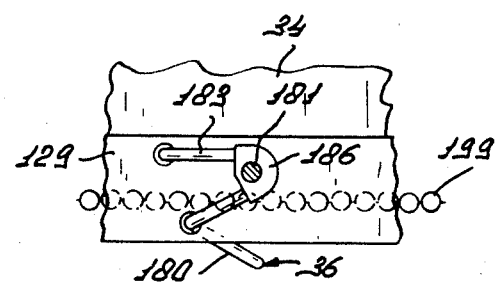
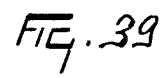
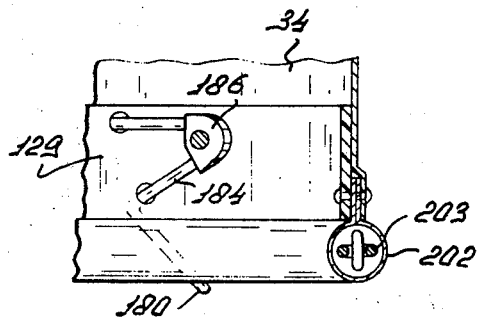
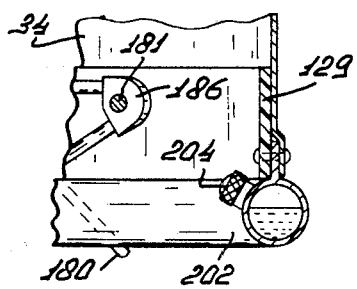

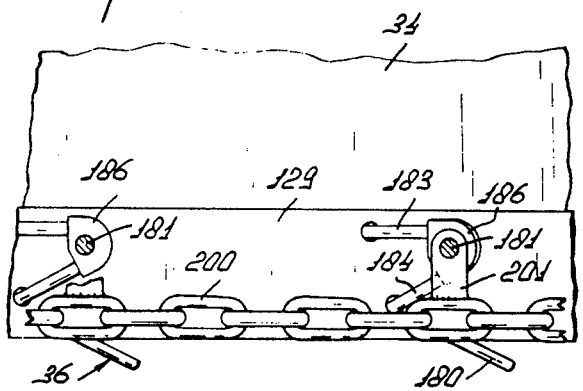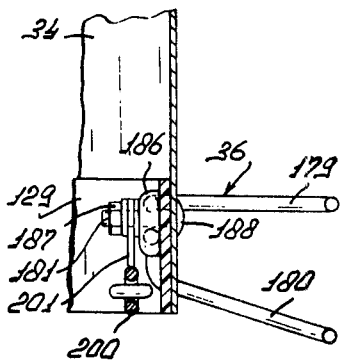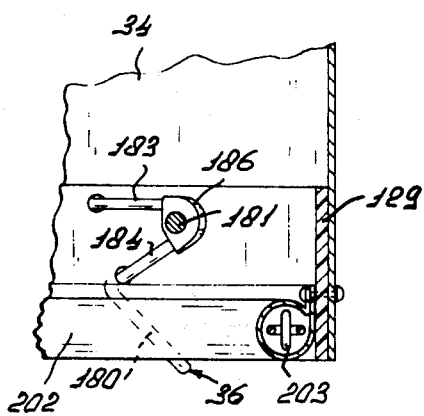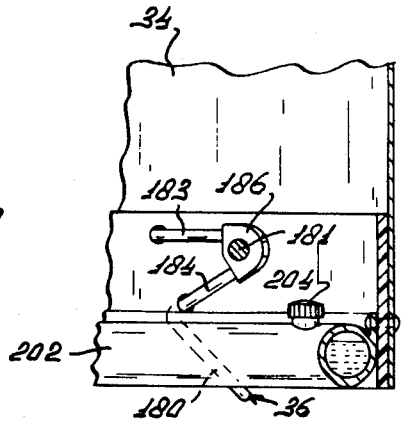

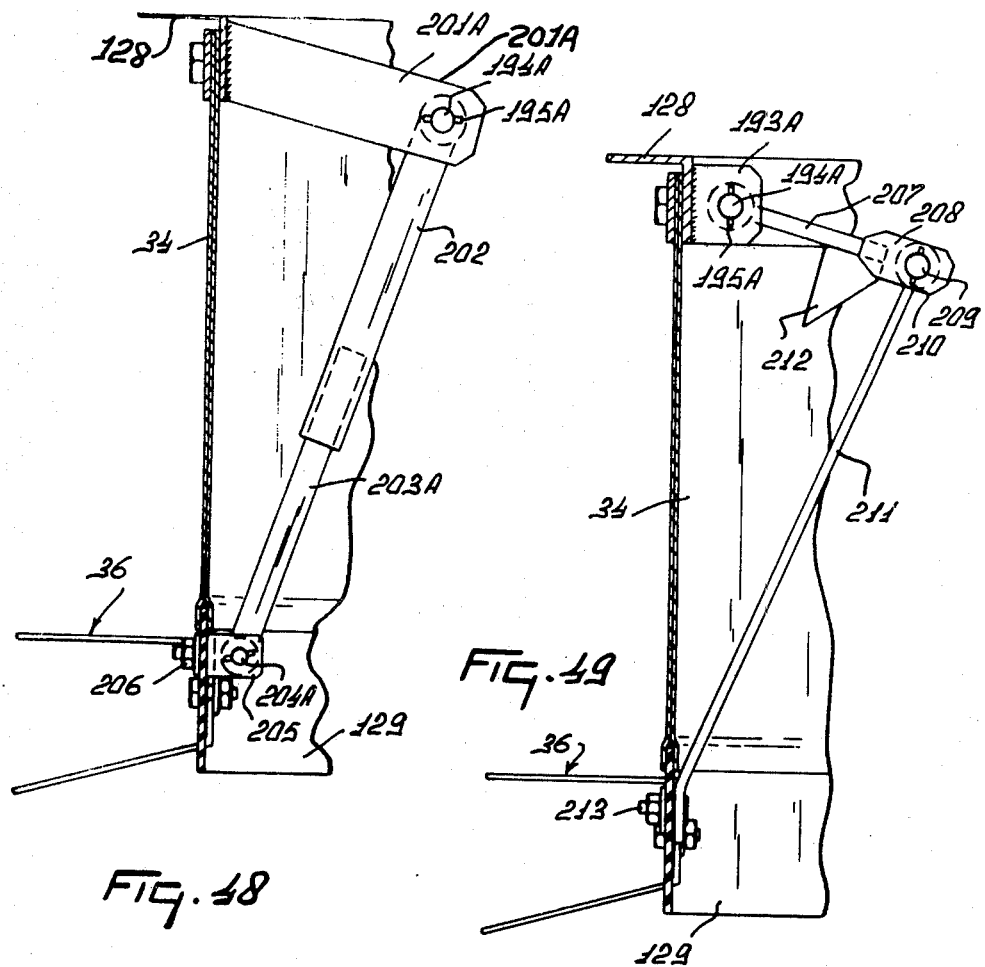
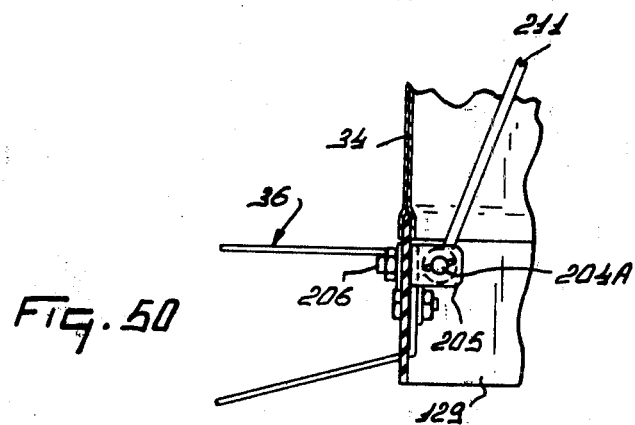

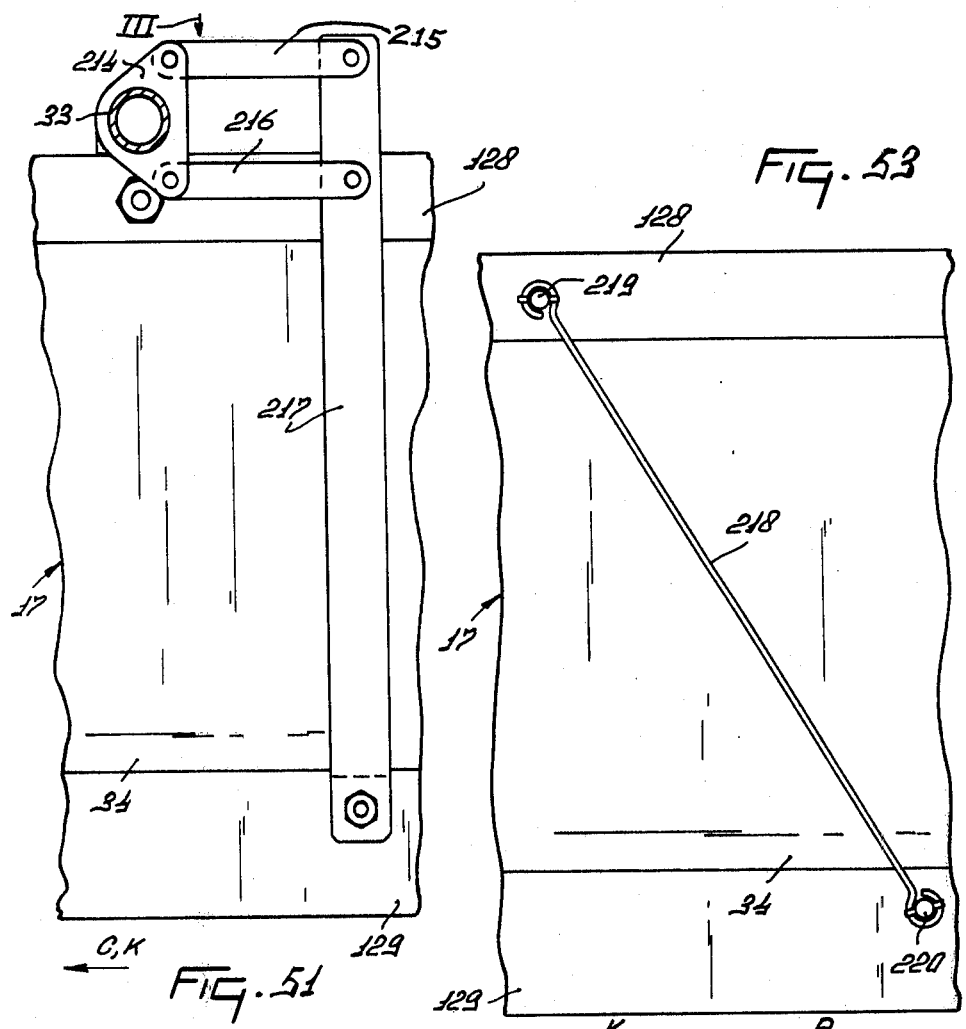
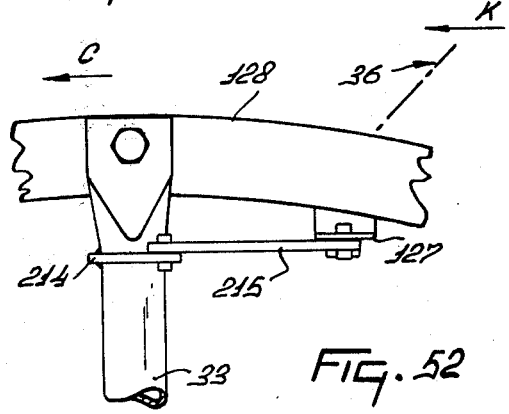

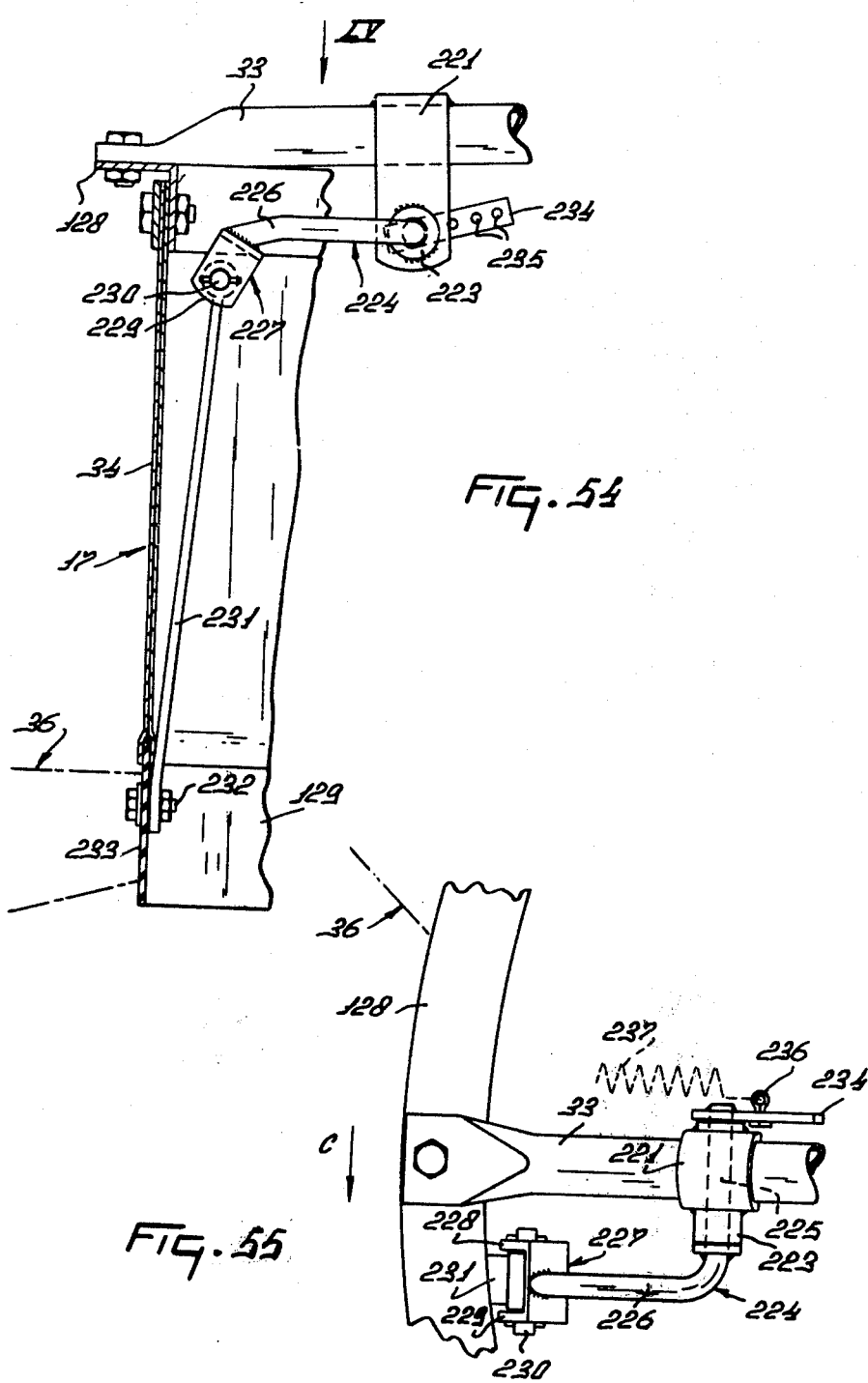

3,962,854

RAKE MACHINE

According to the invention the rake member is provided near its circumference with a wall which is at least partly deformable in one or more directions with respect to the further parts of the rake member, said rake member comprising means for restricting a deformation at least near the lower side of the walls.

In this way a rake member is obtained which is capable of matching unevennesses of the ground in all directions, the reaction of the wall by encountering unevennesses of the ground or heavy crop being suppressed in order to maintain the maximal rake effect.

For a better understanding of the invention and to show how the same may be carried into effect, reference will be made by way of example to the accompanying drawing.

FIG. 1 is a plan view of a machine embodying the invention, attached to a tractor.

FIG. 2 is a sectional view taken on the line II—II of FIG. 1 of a rake member in a first embodiment.

FIG. 3 is an elevation in the direction of the arrow III in FIG. 2.

FIG. 11 is a plan view of a machine embodying the invention, attached to a tractor.

FIG. 12 is a sectional view taken on the lines XII—XII in FIG. 11 of the rake member employed in the machine shown in FIG. 11.

FIG. 13 is an alternative embodiment of part of the section shown in FIG. 12.

FIG. 14 is a plan view of two adjacent rake members of a machine embodying the invention, the frame being omitted.

FIG. 20 is a plan view in section, of part of a further embodiment of a rake member.

FIG. 21 is a sectional view of the FIG. 20 rake member.

FIG. 22 is a plan view in section of part of an alternative embodiment of a rake member.

FIG. 24 is a plan view of a machine comprising a rake member in a further embodiment.

FIG. 25 is a plan view of part of the circumference of the rake member shown in FIG. 24.

FIG. 26 is a sectional view at right angles to the rotary axis of the rake member shown in FIG. 24 showing part of the circumference of the rake member.

FIG. 28 is a plan view and a sectional view at right angles to the rotary axis of an alternative embodiment of a rake member having a flexible wall, viewed parallel to the rotary axis.

FIG. 29 is an elevation in a radial direction of the inner side of the wall in the direction of the arrow XXIX in FIG. 28.

FIG. 30 is a plan view and a sectional view at right angles to the rotary axis of part of the flexible wall in a further embodiment, viewed parallel to the rotary axis.

FIG. 31 is an elevation in a radial direction of the wall in the direction of the arrow XXXI in FIG. 30.

FIG. 32 is a plan view and a sectional view taken at right angles to the axis of rotation of part of the flexible wall in a further embodiment, viewed parallel to the rotary axis.

FIG. 33 is a sectional view in a radial direction taken on the lines XXXIII—XXXIII in FIG. 32.

FIG. 34 is a plan view and a sectional view at right angles to the axis of rotation of part of the flexible wall in a further embodiment viewed parallel to the rotary axis.

FIG. 35 is an elevation in a radial direction of the inner side of the wall in the direction of the arrow XXXV in FIG. 34.

FIG. 36 is an elevation in a radial direction of part of the inner side of the flexible wall in a further embodiment.

FIG. 37 is an elevation in a radial direction of the inner side of the flexible wall in a further embodiment, viewed in a radial direction away from the rotary axis.

FIG. 38 is a sectional view in a radial direction of the flexible wall in the embodiment of FIG. 37.

FIG. 39 is a sectional view in a radial direction of part of the flexible wall in a further embodiment.

FIG. 40 is a sectional view in a radial direction of part of the flexible wall in a further embodiment.

FIG. 41 is a sectional view in a radial direction of an alternative embodiment of the structure shown in FIG. 39.

FIG. 42 is a sectional view in a radial direction of a further embodiment of the structure shown in FIG. 40.

FIG. 48 is a sectional view in a radial direction of the flexible wall in a further embodiment.

FIG. 49 is a sectional view in a radial direction of the flexible wall in another embodiment.

FIG. 50 is a sectional view in a radial direction of part of the flexible wall in a further embodiment.

FIG. 51 is an elevation in a radial direction of the inner side of the flexible wall in a further embodiment.

FIG. 52 is a plan view of the flexible wall in the direction of the arrow LII in FIG. 51.

FIG. 53 is an elevation in a radial direction of the inner side of the flexible wall in a further embodiment.

FIG. 54 is a sectional view in a radial direction of the flexible wall in an alternative embodiment.

FIG. 55 is a plan view of the flexible wall in the direction of the arrow in FIG. 54.

Figure 4:
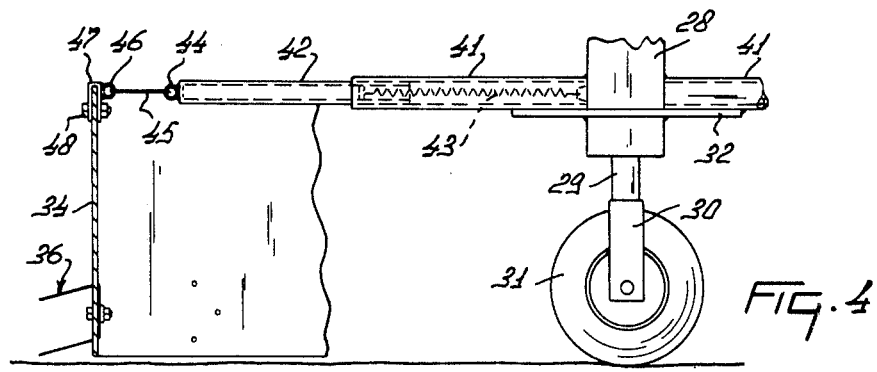
FIG. 4 is a sectional view taken on the lines II—II in FIG. 1 of a second embodiment of a rake member.

The machine comprises a frame 1 shown in FIG. 1 having a tubular trestle 3 adapted to be attached to the lifting device of a tractor 2 moving the machine, the trestle having the shape of an inverted U and being provided near its two free ends with fastening means 4 for connection with the two lower lifting arms of the lifting device of the tractor 2. Near the top of the trestle 3 a fastening means 5 serves to attach the trestle 3 to the top arm of said lift. Near the two fastening members 4 the trestle 3 has secured to it two rearwardly diverging, upright suppoting tubes 6 and 7, the tube 6 having a greater length than the tube 7. The two rear ends of the supporting tubes 6 and 7 are rigidly secured to a tubular, approximately horizontal frame beam 8 the center line of which is at an acute angle to a line at right angles to the direction of movement A so that, viewed in the direction of movement A, the fastening point of the supporting tube 6 on the frame beam 8 is located behind the fastening point of the supporting tube 7 on the frame beam 8. Near the fastening member 5 of the trestle 3 two supporting strips 9 and 10 diverge rearwardly away from the trestle and extend approximately horizontally in operation, the rear ends of said strips being welded near the rear ends of the supporting tubes 6 and 7 respectively.

Approximately midway the length of the frame beam 8 a gear box 11 is secured to the frame beam 8. The gear box 11 comprises a forwardly directed output shaft 12, which can be connected through an auxiliary shaft 13 with the power take-off shaft of the tractor 2. The gear box 11 comprises a gear wheel transmission and output shafts being drivingly connected with two driving shafts. Each of these driving shafts is journalled in the interior of each of the halves of the tubular frame beam 8 and each of them drives at the end remote from the gear box 11, a set of bevel gear wheels journalled in gear boxes 14 and 15 respectively, which are rigidly secured to the ends remote from the gear box 11 of the halves of the frame beam 8. By means of the last-mentioned gear wheel transmissions two rake members 16 and 17 respectively can be rotated about upright shafts 18 and 19 respectively. The rotary shafts or axis of rotation 18 and 19 are parallel to one another and extend vertically, but they may also be inclined in parallel position so that a higher point of each rotary shaft, viewed on plan, is located in front of a lower point thereof. The rake members 16 and 17 shown in FIG. 1 can be driven by means of the gear wheel transmissions in the gear box 11 so that they rotate in the same direction indicated in FIG. 1 by the arrows B and C. Near the rear end of the supporting tube 6 is welded a horizontal support 20, extending transversely of the direction of movement A and provided at its ends remote from the support 6 with a pivotal shaft 21, which is horizontal and extends approximately in the direction of movement A in operation. The pivotal shaft 21 is journalled in a supporting tube 22, which is also rigidly secured to the supporting tube 6 and converge outwardly to the support 20. The pivotal shaft 21 has fastened to it a tubular extension arm 23, extending in operation in a horizontal direct on in line with the support 21, so that it is also transverse of the direction of movement A. The length of the extension arm 23 is such that in operation the arm projects beyond the rake member 16 over a length at least equal to 80 percent of the radius of the rake member 16. The extension arm 23 is furthermore held by a supporting 24, which is rigidly secured to said extension arm 23 and which is pivotally connected with the pivotal shaft 21, the disposition being such that in operation it is in line with the supporting tube 22. To the free end of the extension arm 23 is secured a swath board 25, which extends upwardly and approximately in the direction of movement A. To the swath board 25 is secured a setting pipe 26 at right angles to the surface of the swath board 25, part of said pipe extending in the interior of the extension arm 23. The setting pipe 26 is axially displaceable in the extension arm 23 and by means of a locking member 27 it can be fixed in a plurality of positions so that the distance of the swath board 25 from the frame 1 in a direction normal to the direction of movement A can be varied and fixed. Moreover, the swath board 25 together with the extension arm 23 and the supporting tube 24 can be turned about the pivotal shaft 21 through about 180° until the swath board bears on the frame 1. In this position the swath board 25 is out of operation.

The following description of the various embodiments of the machine shown in FIG. 1 applies to the two rake members 16 and 17.

The rake member shown in FIG. 2 comprises a hub 28 adapted to be driven by means of the gear wheel transmissions of the gear boxes 14 and 15 respectively. The hub 28 is formed by a hollow tube rotatably journalled on a rod 29 rigidly secured in the gear box in operation, to which rod is secured a ground wheel 31 by means of a wheel carrier 30. Near the lower end the hub 28 has welded to it an annular flange 32, which is coaxial to the rotary shafts 18 and 19 respectively. At a plurality of places — for example, ten — along the circumference of the flange 32 a plurality of spring steel supports 33 — for example, ten — are fastened at equal intervals to the flange periphery by clamping. The supports 33 may extend in a radial direction, but with respect to a radial line going through the fastening point concerned they may be disposed so that, viewed in the direction of rotation B and C respectively their outermost ends are located behind the prolongation of the radial line concerned. The sectional area of these spring steel rod-like supports 33 is proportioned so that they behave flexibly under the action of the forces exerted on the further part of the rake member to be described hereinafter. The length of a support 33 is such that it covers about 50 percent, preferably about 80 percent of the radius of the rake member. The ends of the supports 33 remote from the hub 28 holds a flexible, circular wall 34. The supports 33 are fastened near the top side of the wall 34. Alternatively, the supports 33 may be formed by rigid tubes rigidly secured to the hub. The wall 34 has an approximately cylindrical shape, the generatrics of the cylinder extending parallel to the rotary shaft 18 and 19 respectively. The height of the wall 34, measured in the direction of the rotary shaft 18 and 19 respectively is 15 to 25 percent of the diameter of the rake member. In practice the height of the wall is about 40 cms.

The material of the wall is preferably formed by flexible cloth or strip material of reinforced rubber or synthetic resin with or without local reinforcements formed, for example, by flexible wires or strips. Comparatively light-weight material such as plasticized canvas may also be employed. The nature of the material has to be such that under the action of the forces exerted thereon the wall 34 can locally deflect with respect to the hub 28 in a direction parallel to the rotary shaft and also in a radial direction with respect to the adjacent wall port ons. The lower edge of the wall 34 is located near the ground in operation. The supports 33 can be fastened in a simple manner to the upper circumference of the wall 34 by providing the end concerned of each support 33 with an eyelet and bend down through 90° so that a bolt can be passed through the eyelet and a hole provided in the upper rim of the wall, rings being arranged on the bolt on either side of the wall material. The inner side of the wall 34 may be stiffened by means of a stiffening strip 35, which is arranged all around on the inner side of the wall 34 parallel to a plane at right angles to the rotary shaft. The stiffening strip is preferably arranged at a distance from the lower edge of the wall 34 equal to 25 to 50 percent of the height of the wall, preferably about 40 percent. The stiffening strip 35 is preferably made from spring steel having approximately the same flexibility as one of the supports 33, the major part of a sectional area of said strip being parallel to the rotary shaft. The stiffening strip 35 prevents an excessive deformation of the wall 34.

Along the whole circumference of the lower edge of the wall 34 a large number of groups of tines 36 are provided on the flexible material of said wall. The number of groups of tines 36 arranged at regular intervals along the circumference is in this embodiment sixteen. The two tines of each group are located in a vertical plane.

The length of each of the tines of a group is about 10 to 15 percent of the radius of the wall 34, preferably about 12.5 percent of said radius. The tines of each group 36 are in trailing positions behind the corresponding radial line with respect to the direction of rotation B, C so that they are at an angle of about 30° to 60°, preferably about 45° to a radial line passing through their fastening point. Viewed in the direction of rotation, their ends are located after said radial line. Away from the area where the tines of a group project from the wall 34 the tines extend outwardly and downwardly, the direction of a tine being at an angle of 10° to 30° to the ground.

The tines of each group 36 are fastened to the inner side of the wall 34 (FIG. 3). From the area where one of the tines is passed through the flexible wall 34, this tine is bent over from its position described above on the outer side of the wall 34 in a direction approximately parallel to a generatrix on the inner side of the wall (to form a supporting portion 37), after which the end of the supporting portion 37 remote from the active tine portion is again bent over through an angle of about 100° to 150° to form a supporting portion 38, which is therefore at an angle to a plane normal to the rotary shaft, while the curvature corresponds with the local curvature of the wall. The supporting portion 38 terminates at its end remote from the supporting port on 37 in a portion bent approximately circularly through 360°, which is secured in place by means of a circlip 39 and a bolt 40 passed through a hole in the wall 34. The bent portion located beneath the circlip 39 terminates again in a supporting portion 38 and a supporting portion 37 holding the other tine of the same group 36. The supporting portions 37 and 38 of each of the tines are arranged in mirror fashion with respect to a plane at right angles to the rotary shaft and going through the center line of the bolt 40. The length of the supporting portion 38 is about 2 to 3 times the length of the supporting port on 37. Owing to the supporting portions 37 bearing on the wall 34 and to the supporting portions 38 the tines of the group 36 are held in a vertical and horizontal direction at the appearance of forces on the flexible wall in operation. Viewed in the direction of rotation, the supporting portions 37 and 38 are, for this purpose, arranged in front of the fastening bolt 40, the active tine portions being orientated to the rear, viewed in the direction of rotation.

In the embodiment shown in FIG. 4 a plurality of spokes 41 — for example, six — are rigidly secured, for example, by welding, to the top side of the flange 32 and, if desired, to the hub 28, the spokes extending in a radial direction. The spokes 41 are formed by rigid pipes, extending parallel to a plane at right angles to the rotary shaft 18 and 19 respectively. Each of the spokes 41 accommodates a pipe-shaped extension arm 42, which is axially displaceable in the spoke 41. Near the end of the extension arm 42 near the hub 28 a tensile spring 43 extends inside the pipe-shaped spoke 41, the other end of said spring being secured to the hub 28. This end is fastened before the spoke 41 is fastened to the flange 32. A stop (not shown) prevents the extension arm 42 from getting out of the spoke 41. The rigidity of the tensile spring 43 is such that at a standstill of the rake member the extension arm 42 is almost entirely located inside the spoke 41. The length of a spoke 41 is 40 to 60 percent of the radius of the rake member in operation and the length of the extension arm 42 is approximately equal to that of the spoke 41. To the end of the extension arm 42 remote from the hub 38 is fastened by means of an eyelet 44 of the extension arm 42, a steel wire strip 45 so as to be pivotable in upward and downward and, moreover, in a tangential direction. The end of the strip 45 remote from the extension arm 42 is passed through an eyelet 46, which is welded to a U-shaped bracket 47, which is fastened by a bolt 48 to the top side of the wall 34. The disposition and fastening of the group of tines 36 are identical to those described for the embodiment shown in FIGS. 2 and 3.

Figure 5:
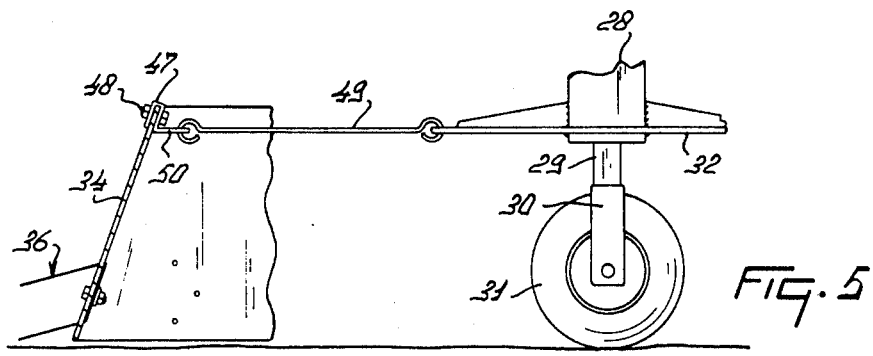
FIG. 5 is a sectional view taken on the lines II—II in FIG. 1 of a third embodiment of a rake member.

In the embodiment shown in FIG. 5 the wall 34 is not cylindrical, but it has the shape of a cone. The wall 34 extends parallel to a conical plane, the apex of which is located above the flange 32 on the rotary axis, the axis of the conical plane coinciding with the rotary axis and the vertex being about 20° to 40°. The wall 34 is fastened on the top side by means of a steel strip 49 having eyelets at both ends of the flange 32, which has a corresponding number of holes at its circumference, the strip being hooked at the end remote from the hub 28 into a hole provided in a bracket 50 extending at right angles to the rotary shaft, said bracket 50 being integral with a U-shaped bracket similar to the bracket 47. The web of the latter bracket is located on the top edge of the wall 34 and the limbs are located on either side of said wall and fastened by a bolt similar to the bolt 48 of FIG. 4. The length of the steel strip 49 is 40 to 50 percent of the major radius of the wall 34. The pivotable connection of the strip 49 is located directly adjacent the top edge of the wall 34.

Figure 6:
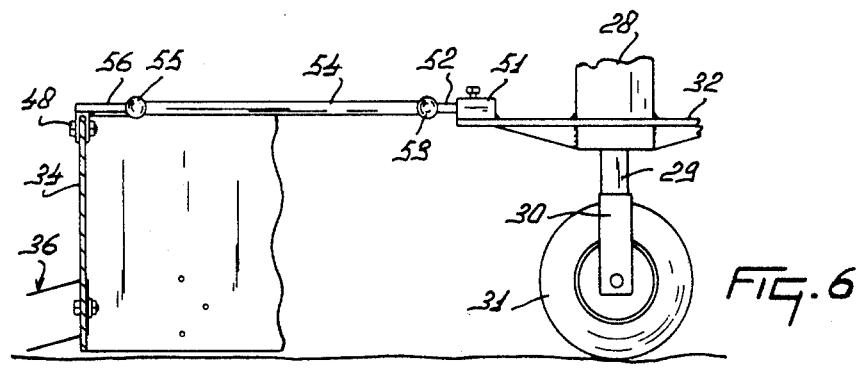
FIG. 6 is a sectional view taken on the lines II—II in FIG. 1 of a fourth embodiment of a rake member.

In the embodiment shown in FIG. 6 the outer edge of the flange 32 is provided with a plurality of clamping blocks 51 holding short bars 52. At the end of each bar 52 remote from the hub 28 a ball-and-socket joint 53 connects a steel bar 54 pivotally with the bar 52 and at the other end of the bar 54 a further ball-and-socket joint 55 is provided to form an omni-directionally pivotable joint between the bars 54 and 56, the latter being in operation at right angles to the rotary shaft and being welded to the top side of a bracket, which is similar to the bracket 47 of the preceding embodiments and which connects the bar 56 on the top side with the wall 34. The length of the bar 54 is 50 to 60 percent of the radius of the here cylindrical wall 34. The ball-and-socket joint 55 is located at a very short distance from the wall 34.

Figure 7:
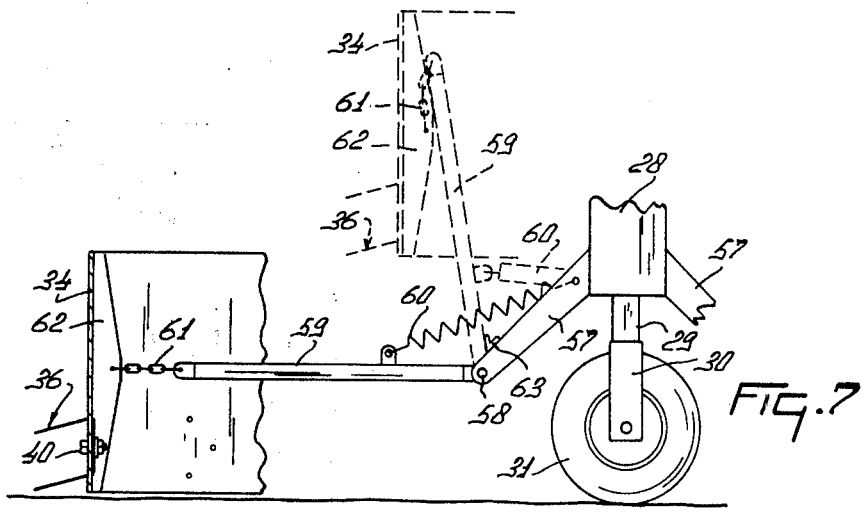
FIG. 7 is a sectional view taken on the lines II—II in FIG. 1 of a fifth embodiment of a rake member.

In the embodiment shown in FIG. 7 the hub 28 is provided with a plurality of spokes 57, for example, four or six, extending away from the hub 28 downwardly in inclined positions so as to be at an angle of about 45° to the rotary shaft. At the end of each spoke 57 remote from the hub 28 is arranged a pivotal shaft 58, the center line of which crosses the rotary axis at right angles. Viewed parallel to the rotary shafts 18 and 19 respectively, the distance of each pivotal shaft 58 from the rotary shaft is about 20 to 30 percent, preferably about 25 percent of the radius of the flexible wall 34 in operation. To each pivotal shaft 58 is pivoted a rigid, rod-shaped extension arm 59. At approximately equal distances from the pivotal shaft 58 the ends of a tensile spring 60 are fastened to the extension arm 59 and to the corresponding spoke 57 so that the tensile spring 60 tends to turn the extension arm 59 in upward direction relative to the spoke 57. At the end of the extension arm 59 remote from the pivotal shaft 58 a flexible fastening member formed by a chain 61 is fastened by hooking, the end of the chain 61 remote from the extension arm 59 being connected with a stiffening strip 62, which extends along a generatrix of the here cylindrical wall 34 and which serves to control the local wall deformation. While it is fastened to the wall 34 at various spots along its length. The stiffening strip 62 is essentially L-shaped, one of the limbs being fastened to the wall 34 at several places, whereas the other limb extends radially and has a fastening point for the chain 61. The fastening point of the chain 61 on the stiffening strip 62 is located, viewed in the direction of the rotary shaft, approximately midway the height of the wall 34. In order to limit the upward movement of the extension arm 59 with respect to the spokes 57 the spoke 57 is provided with a stop 63 at a place such that the extension arm 59 can swing upwardly until it is approximately parallel to the rotary shaft.

The rake members described above operate as follows. Each of the rake members 16 and 17 is driven via the auxiliary shaft 13, the gear wheels of the gear box 11, the driving shafts located in the frame beam 8 and the gear wheels of the gear boxes 14 and 15 so that in this embodiment the rake members rotate in the same direction (B,C). All constructions shown in FIGS. 2 to 7 comprise a flexible wall 34, which serves for the groups of tines 36 in addition as a felly, and which assumes a cylindrical operational position by centrifugal force. Owing to the centrifugal force the supports 33 (FIG. 2), the strips 49 (FIG. 5) and the bars 54 (FIG. 6) will assume positions approximately at right angles to the rotary shaft. In the construction shown in FIG. 4 each tensile spring 43 is stretched by the outward movement of the mass of the wall 34 and the extension arms 42. In operation, the position of the extension arm 42 relative to the associated spoke 41 is determined by the state of equilibrium in which the tensile force of the springs 43 neutralizes the centrifugal force. The strip 45 will also assume a position normal to the rotary shaft due to the centrifugal force exerted on the wall 34. In the embodiment shown in FIG. 7, the extension arm 59 will turn with respect to the spoke 57 about the pivotal shaft 58 until it is approximately normal to the rotary shaft. The spring 60 essentially serves only to withstand the mass of the wall 34, the strips 62, the chains 61 and the extension arms 59 at a standstill of the rake wheel.

Since the flexible wall 34 moves in a rotating movement along the ground in the direction of travel A, while the lower side of the wall 34 rotating about an approximately vertical axis is located throughout its circumference, at least in these embodiments, directly above the ground, the crop encountered by the lower side of the wall 34 is displaced in the direction of rotation B,C, the lower edge of the wall 34 sliding along the ground in a linear and simultaneously rotating movement. It should be emphasized that the wall 34 itself is in the first place a crop-displacing member. Apart from and during the linear movement of the wall 34 in the direction A for the lateral displacement of the crop by the lower edge of the wall 34, the engagement of the crop by the outer surface of the wall 34 may be enhanced. Since the whole outer surface of the wall 34 contributes to the displacement of the crop, has unevennesses so that this outer surface can more firmly engage the crop. With a view to this function, the lower portion of the outer surface of the wall 34 is provided with a large number of extensions, which are formed in this case by groups of short tines. It should be noted, however, that it is not absolutely necessary to use extensions in the form of tines in order to achieve the desired effect of crop displacement. It may also be sufficient to provide a great number of plate-shaped extensions having each the shape of a radially arranged flat plate; they may, however, also have the shape of blades.

The use of extensions on the whole circumference of the outer surface of the wall 34 coming into contact with the crop thus enhances the shifting effect exerted on the crop by the wall itself. In the machine shown in FIG. 1 the wall 34 of the rake member 17 will displace laterally the crop towards the rake member 16 by its movement along the ground in the direction of travel A in conjunction with its rotation in the direction C, which is enhanced by the firmer grip of the wall 34 on the crop obtained by the extensions formed herein by the groups of tines 36. The length of the tines is found to be comparatively short as compared with the tines of known cyclic hay-making machines.

The crop shifted by the rake member 17 to a place between the two members 16 and 17 is again displaced in the direction towards the swath board 25 by the wall 34 of the rake member 16 supported by its groups of tines 36. It appears that when the wall again moves away from the swath board 25 during its rotation with respect to a line at right angles to the direction of travel A the crop is released at this place, particularly when the tines are in positions behind the corresponding radial like with respect to the direction of rotation, so that the crop is deposited on a strip of land limited by the swath board 25 and the nearest point of the wall 34 of the rake member 16. It is found that the machine shown in FIG. 1 yields results comparable with those of a side-delivery rake.

Since the wall 34 is flexible in the direction of the rotary shaft 18 and 19 respectively as well as in a radial direction, the under side of the wall 34 shifting the crop along and around is capable of matching unevennesses of the ground under any condition and, which is very important, it can immediately match the next shape of the ground during passing along said unevennesses and after this passage, without the lower side of the wall 34 leaving the ground surface so that the crop is always carried along. Owing to the resilient supports 33 (FIG. 2), the strips 45 (FIG. 4), the strips 49 (FIG. 5) and the bars 54 (FIG. 6) the wall as a whole can shift in place with respect to the rotary shafts 18 and 19. The wall 34 need not shift its place in an axial direction, but it is capable of tilting as a whole about the rotary shaft owing to an eccentrical force exerted anywhere on the lower edge of the wall 34. Since the wall 34 itself is flexible, local deformations of the wall may readily occur during the passage of obstacles, in which case part of the wall can fold in upward direction relative to the surrounding portion, while it can deflect from the cylindrical or conical shape assumed as a result of centrifugal force. Owing to the omnidirectional adaptability and the stabilizing centrifugal forces stretching the wall into the cylindrical or conical shape and stabilizing the same with respect to the rotary shaft, the undisturbed shape is reassumed immediately after the cause of the relative motions and deformations of the wall has been obviated. The lower edge of the wall does not leave the ground so no crop will be left behind.

The construction shown in FIG. 7 is a preferred embodiment, in which fastening of the wall 34 midway the height of the wall, measured in the direction of the generatrix, ensures in operation a stable position of the wall. When encountering obstacles the wall 34 can move as a whole owing to the flexible suspension by means of the chains 61 and since the extension arms 9 59 are readily capable of turning about the pivotal shafts 58. In this embodiment the lower portion of the wall 34 can readily match the unevennesses of the ground and this may be further improved by omitting the lower portion of the stiffening strip 62, while maintaining the place of the point of application of the chain 61 so that the flexible behavior of the lower edge of the wall 34 is ensured at all spots of its circumference. For the same reason the flexible rim 35 (FIG. 2) is arranged above that portion of the outer surface of the wall 34 which comes into contact with the crop. Especially in the case of very lightweight, thin wall structures the surface is thus prevented from folding excessively. The embodiments described are not only particularly suitable for the raking effect with rake members rotating in the same direction but also in opposite senses and also for machines having one rake member.

When the rake members 16 and 17 are put out of operation, they are both lifted by means of the lifting device of the tractor 2 prior to or during stopping of the device. The wall 34 of FIG. 2 will occupy after being lifted approximately the same position as in operation, however the supports 33 will be slightly bent by the weight of the wall 34. In the construction shown in FIG. 4 the extension arms 42 will be drawn towards the hub 28 by the tensile springs 43, when the drive has been stopped, so that the diameter of the rake member can be reduced approximately by half and after the rake member has been lifted, the strips 45 will hang down with respect to the extension arms 42 so that also the upper rim of the wall 34 will lie beneath the spokes 41, the flexible wall 34 being then drastically folded. When the rake member shown in FIG. 5 is lifted, the strips 49 will hang down substantially in a vertical direction with respect to the flange 32, the wall 34 folding up narrowly and the diameter of the rake member being thus strongly reduced. The same applies to the bars 54 hanging down in transport as shown in the embodiment of FIG. 6. When the rake member in the embodiment shown in FIG. 7 is lifted and the drive is stopped, the extension arm 59 will turn upwardly by the action of the tensile spring 60 approximately into the position shown in broken lines. The chains 61 will hang down from the end of the extension arm 59 remote from the pivotal shaft 58. Also, in this case a considerable reduction of the diameter of the rake member is obtained while it is avoided that the wall 34 should hang on the lower side of the rake member, since in this case, with respect to the hub 28, the wall is moved upwardly into the transport position, the wall 34 itself folding up again.

Particularly the constructions shown in FIGS. 4 to 7 are highly suitable for use in a machine comprising a plurality of rake members, since they have the advantage that at a standstill of the rake member the diameter thereof is materially reduced so that the overall width of the machine in transport is considerably reduced. These advantages apply, of course, also to machines having only one rake member, the dimensions of which are such that in operation the rake member projects beyond the width of the tractor.

The mode of fastening of a tine group 36 shown in FIG. 3 to the wall 34 is particularly intended to obtain optimum stability of the group of tines with respect to that portion of the flexible wall which is located closely around the group of tines 36. The supporting parts 37 and 38 are therefore arranged on the inner side of the wall 34 so that, when the tines are loaded said parts are urged against the inner side of the wall, while the spread arrangement of the supporting parts 38 and of the upwardly extending supporting parts 37 both in a vertical and a horizontal sense assist in holding the groups of tines so that the latter will not deflect when loaded.

Figure 8:
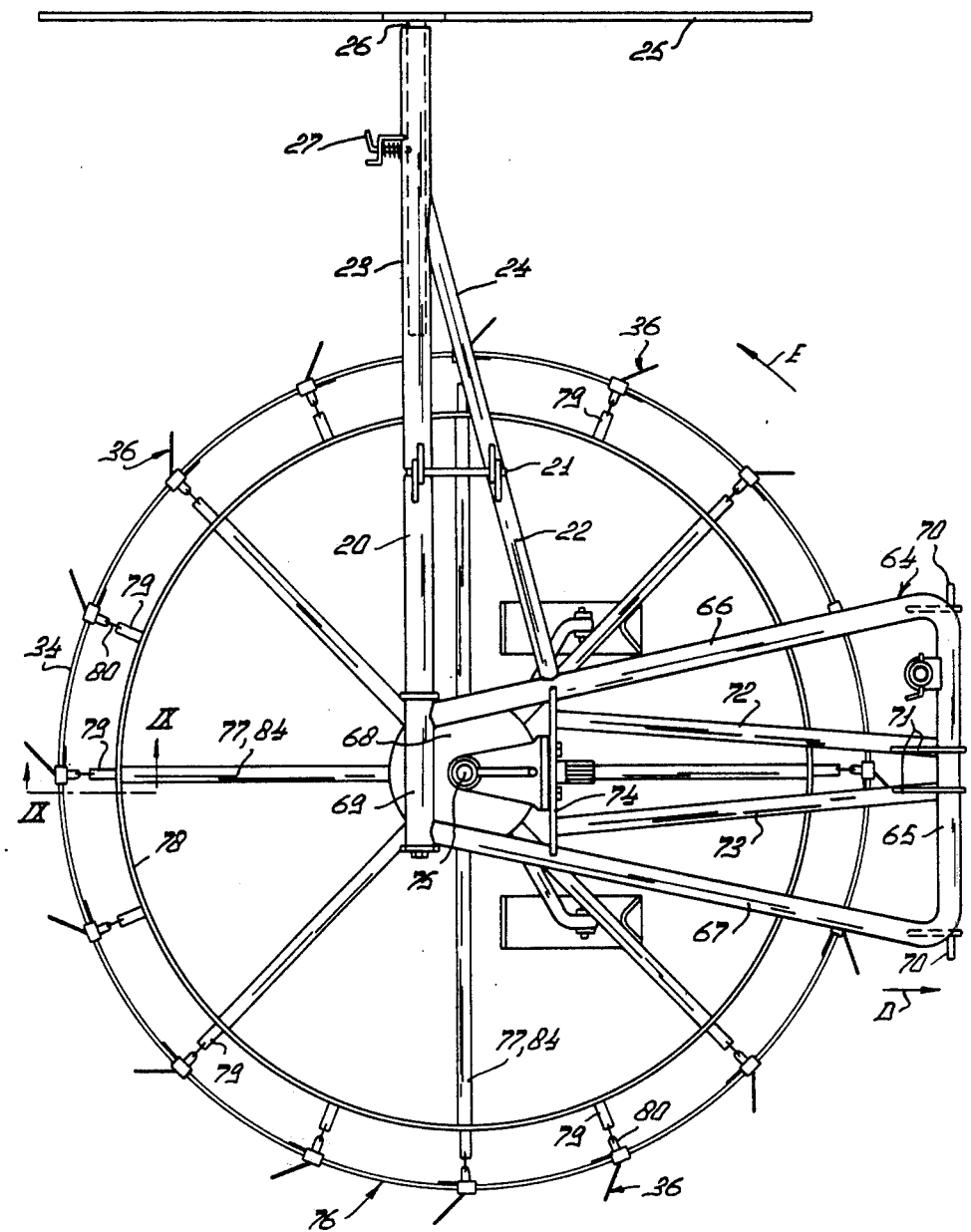
FIG. 8 is a plan view of a further machine embodying the invention.

The machine shown in FIG. 8 comprises a frame 64 of substantially triangular shape, viewed on plan, the apex of the triangle being located behind the basis of the isosceles triangle, viewed in the direction of movement D, the basis of the triangle being at right angles to the direction of movement D. This basis is formed by a trestle 65 formed by a tube in the shape of an inverted U. The two ends of this tube terminate in rearwardly converging supporting tubes 66 and 67, which are interconnected and furthermore connected with the rear portion of a gear box 68. The rear ends of the supporting tubes 66 and 67 are interconnected by a horizontal transverse extension arm 69, in line with which a supporting structure for a swath board 25 is provided, which is completely similar to that shown in FIG. 1. The corresponding parts are designed by the same reference numerals. The U-shaped trestle 65 is provided near its lower end with fastening means 70 for attaching the machine to the lower arms of the lifting device of the tractor 2. Near its top the trestle 65 has fastening means 71 for attachment to the top arm of the lifting device. Away from the fastening means 71 two tubular pull rods 72 and 73 diverge rearwardly and downwardly, the rear ends thereof being secured to a supporting plate 74, extending transversely of the direction of movement D and serving at the same time for holding the front part of the gear box 68. The gear box 68 comprises a rotary shaft 75, occupying a vertical position in operation. A rake member 76 is rotatable about said shaft and secured to the frame.

Figure 9:
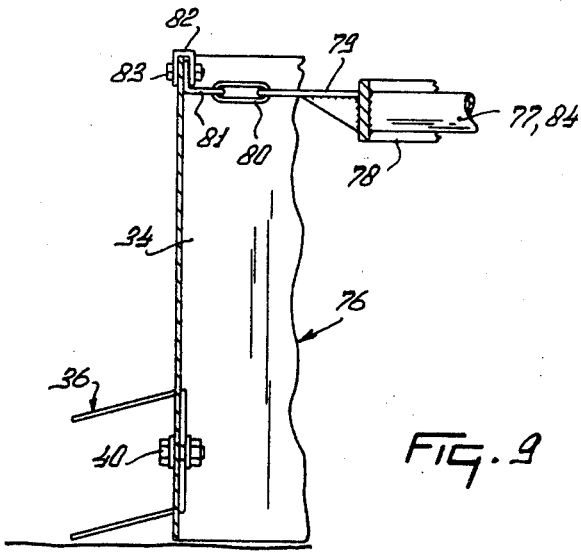
FIG. 9 is a sectional view taken on the lines IX—IX in FIG. 8 of a first embodiment of the associated rake member.

A hub 79A located beneath the gear box 68 for the rake member 76 has secured to rigidly a plurality of spokes 77 (in this case eight), which extend radially, viewed on plan. The ends of the spokes 77 remote from the hub of the rake member 76 are interconnected by a felly 78, which is coaxial to the rotary shaft 75 and is made from rectangle-section strip material, the major dimension of which extends parallel to the rotary shaft 75 (FIG. 9). Near the outermost end of each spoke 77 an extension arm 79 is rigidly secured to the felly 78, the extension arm being in line with the spoke 77. The end of an extension arm 79 remote from the spoke 77 has a hole for passing a link 80, the other end of which is fastened to an L-shaped bracket 81, the upright limb of which is in contact with the upper edge of the wall 34, while a U-shaped bracket 82 has its limbs located on the outer side of the wall 34 and on the outer side of the upright limb of the bracket 81 respectively, the assembly being clamped tight by means of a bolt. The groups of tines 36 are arranged in the same manner and are proportioned in the same way as in the preceding embodiments and they are fastened in the manner shown in FIG. 3.

Figure 10:
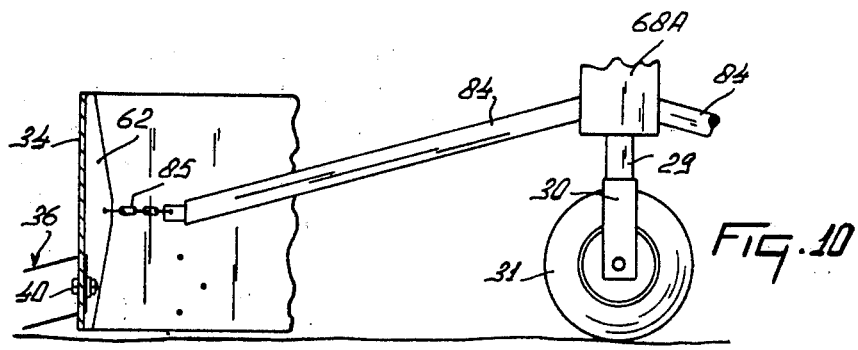
FIG. 10 is a sectional view taken on the lines IX—IX in FIG. 8 of a second embodiment of an associated rake member.

In the embodiment of the rake member 76 shown in FIG. 10 the spokes are not normal to the rotary shaft, but viewed on plan they extend in a radial direction away from the hub 68A. From said hub they extend downwardly and are at an angle of about 30° to a plane at right angles to the rotary shaft 75. The outermost end of each spoke 84 has secured to it a flexible tensile member, for example, a chain 85, whose other end is secured in the same manner to a stiffening strip 62 of the wall 34. The further structure of the wall 34, the stiffening strip 62 and the groups of tines 36 is identical to that described with reference to FIG. 7. The rake member 76 is held in the manner described above by means of a supporting member, for example, a ground wheel 31, coupled with the rod 29 through a carrier 30.

The drive of the rake member 76 is performed by an auxiliary shaft linked to the power take-off shaft of the tractor 2 and the input shaft of the gear box 68 so that the rake member is rotated in the direction E. The tines of the groups 36 are again in a trailing position behind the corresponding radial line relative to the direction of rotation E. Since the diameter of the rake member 76 does not or scarcely exceeds the width of the tractor, the length of the spoke 77 or 84 may be greater than in the case of a plurality of rake members to be driven. Viewed parallel to the rotary shaft 75 the length of a spoke 77 or 84 is about 75 to 85 percent of the radius of the wall 34, which is cylindrical in operation. The comparatively short, flexible link between the spokes and the wall, which is required for ensuring the flexible properties of the wall as a whole, is achieved by means of the link 84 of the chain 85. When the rotation of the rake member 76 is stopped and the machine is lifted by means of the lifting device of the tractor 2, the flexible connections (links 80 and chain 85) will hang down from the ends of the spokes, while the wall 34 folds up. For transport it is furthermore only necessary to turn the swath board 25 over 180° about the pivotal shaft 21 and to lie it down on the frame 64. Since, viewed on plan, the pivotal shaft 21 is located within the circumference of the rake member, the swath board will not enlarge the width of the machine in the transport position. The extension arms 79 are arranged not only at the ends of the spokes 77 but also between pairs of spokes on the felly 78. The felly 78 provides a hold for the flexible wall 34 at many areas along the circumference without the need for using a large number of spokes 77. The fairly short lengths of the flexible connections formed by the links 80 and the chains 85 contribute to a stable position of the wall 34 in operation, viewed in the direction of rotation. The driving torque of the rake member is transferred in a stable manner through the smaller number of horizontally rigid spokes 77 to the wall 34 and the felly 78 then contributes to an increase in the rotational inertia of the rake member 76 so that a uniform circumferential speed is obtained. The remark about the felly 78 also applies to the embodiment shown in FIG. 10.

The flexible links between the hub 28 and the wall 34 in the embodiments shown in FIGS. 2, 5 and 6 are slightly bent or turned tangentially, whereas nevertheless a uniform circumferential speed is ensured. These structures impart to the wall 34 very satisfactory additional deflectability in an axial and a tangential direction.

The machine shown in FIG. 11 is adapted to be attached by means of a trestle 86 to the lifting device of a tractor 2. viewed horizontally in the direction of movement F the trestle 86 has a triangular shape, the apex of the triangle being located near the top arm of the lift, whereas the base of the triangle extends between the two lower arms of the lift. Near the corners of the triangle the trestle 86 is provided with fastening means for suspending the machine to the lifting device. To the trestle 86 is secured a rearwardly extending steel sheet support 87, whose shape is also triangular in a vertical section, the base of the triangle being horizontal and located on the top side of the triangle, whereas the apex of this isosceles triangle is located on the bottom side. The base is welded near the top side of the trestle 86, while the foremost end of the lower boundary is welded to the base of the trestle 86. Viewed on plan, the two boundary lines of the support 87 converge rearwardly. The support 87 is hollow and the foremost end is open for accepting an auxiliary shaft to be linked to the power take-off shaft of the tractor, the rear end of said auxiliary shaft being adapted to be connected with the input shaft 96 of the gear box 88, in which the rake member 89 is journalled by means of a means of a shaft 29. Near the hindmost end of the support 87 a horizontal beam extends transversely of the direction of movement F and is provided at its end with a pivotal shaft 92, about which a swath board 93 extending in the direction of movement together with its extension arm 94 can be turned through 180° into a transport position. The swath board 93 has at right angles to its surface a tube 95 adapted to slide axially in the extension arm 94 so that the distance of the swath board 93 from the circumference of the rake member 89 is variable.

From FIG. 12 it will appear that the rotary movement of the input shaft 96 is converted through bevel gear wheels 97 and 98 into a rotary movement of the hub 99, which is rigidly secured to a gear wheel 98. On the lower side the hub 99 is provided with a flange 100, to which a support 102 is secured by bolts 101.

The whole rake member 89 is journalled around the stationary rod 29, which holds through the wheel carrier 30 a supporting member in the form of a ground wheel 31. The bevel gear wheel 98 is held with the air of a bearing 103 and the flange 100 connected through the sleeve-like hub 99 with the gear wheel 98 is held by means of a bearing 104 on the rod 29. The bearings 103 and 104 are spaced apart from one another in an axial direction and a sleeve 105 not being rotatable with respect to the rod 29 serves as a spacer sleeve. The support 102 extending beneath the lower bearing 104 is a frustoconical plate, the apex of which is located above the support 102 on the rotary axis 90, while the axis of the cone coincides with the rotary axis 90 (the center line of the rod 29).

Half the vertex of the truncated cone is about 30° to 35°. By means of bolts 106 a second support 107 is fastened to the lower side of the bevel gear wheel 98. Viewed in the direction of the rotary shaft 90 the support 107 is located between the topmost bearing 103 and the lower bearing 104 and is therefore located completely above the support 102. The support 107 has also the shape of a conical surface and is also made from sheet material. The apex of the conical surface of the support 107 is located on the top side of the support on the rotary axis 90 and the axis of the cone coincides with the rotary axis 90 and half the vertex of the cone is about 70° to 80°. The largest diameter of the support 107 is about 1.5 to 2.5-times, preferably 2-times the largest diameter of the support 102. On the outer circumference the support 107 is provided with a downwardly bent flange 108 coaxial to the rotary shaft 90. On the outer edge the support 102 is provided with a flange 109, which extends parallel to a plane at right angles to the rotary shaft 90.

The rod 29 and hence the ground wheel 31, as in the preceding embodiments, is adjustable in a direction of height with respect to the rake member 89 in known manner (not shown) and can be fixed in a plurality of positions. The rotary shaft 90 is, in operation, approximately vertical, but it may alternatively be at an acute angle to the horizontal plane, so that, viewed in the direction of movement F, a higher point of the rotary shaft is located in front of a lower point thereof.

The rake member 89 is provided with a flexible wall 34, the material and features of which correspond with the preceding description. The height of the wall 34 is at least equal to the distance of the lower edge of the support 107 from that of the support 102 and in this embodiment it is 1.2 – 1.4-times preferably about 1.3-times the last-mentioned distance. The top edge of the wall 34 is provided with a plurality of L-shaped stiffening strips 110, each of which covers a portion of the inner circumference of the wall 34 and by means of nails, bolts or glue they are fastened to the wall 34. In the embodiment shown in FIGS. 11 and 12 four stiffening strips 110 (FIG. 11) are provided: at least in this embodiment they cover a circumferential angle of about 60° so that two of the eight groups of tines 36 are located within said circumferential angle. The stiffening strips 110 are regularly distributed along the circumference of the wall 34 so that intermediate two adjacent stiffening strips, in a circumferential angle of about 30°, no stiffening is found on the upper rim of the wall 34. The flange of the stiffening strip 110 is, in operation, orientated inwardly and is provided with two bolts 111, by which flexible connecting members, in this embodiment chains 112, are fastened to the stiffening strips 110 and hence to the wall 34. The ends of the chains 112 remote from the wall 34 are each fastened to a bracket 113, which is resilient in a radial direction and which is secured to the lower side of the support 107. Each bracket 113 is preferably made from spring steel wire and is arranged parallel to a radial plane. In the elevation of FIG. 12 the bracket 113 is passed from the outer circumference of the support 107 first to the outside, then bent downwardly through an angle of about 180° and then comprises a straight portion, which, viewed in the elevation of FIG. 12, converges with the plate section of the support 107 inwardly, where it is again bent over downwardly and outwardly through 180°, where it is bent over inwardly through about 90° to form subsequently an upwardly bent-over portion, which is secured to a point of the support 107 located approximately midway the radius of said support. The fastening point of the chain 112 located, in operation, in the outermost bent portion of the bracket 113 can be shifted inwardly together with the portion converging to the surface of the support 107. Then the innermost link of the chain 112 can be arranged in the inwardly and outwardly orientated portion of the bracket 113 so that in the transport position the chain is fixed in place against outward movement. The chain 112 is arranged near the two ends of each stiffening strip 110 so that the outermost end of the chain, viewed on plan (FIG. 11) is located in the proximity of a group of tines 36.

On approximately half of the height of the wall 34 (FIG. 12) a U-shaped stiffening strip 114 of sheet material is arranged on the lower part, the limb of which extends in the direction of height of the wall 34, and the two limbs of said strip being at right angles to the wall 34. The two limbs of the strip 114 have the same width as the projecting limb of the stiffening strip 110 and, viewed on plan (FIG. 11) they approximately coincide with the elevation of the stiffening strip 110 so that the circumferential angles covered by the stiffening strips 110 and 114 are approximately equal. The strip 114 is also secured to the wall 34 by means of nails, bolts or glue.

Both the topmost, inwardly orientated limb of the U-shaped strip 114 and the lower limb thereof are provided with flexible members formed by chains 115 and 116 respectively, which extend away from the corresponding limbs of the strip 114 towards the flange 109 of the support 102. The chain 115 is fastened to the strip 114 by means of a bolt 117 and the chain 116 by means of a bolt 118 and the two chains 115 and 116 are in common fastened to the flange 109 by a single bolt 119. In operation the chain extends away from the stiffening strip 110 towards the bracket 113 in an upwardly inclined position and in operation the chains 115 and 116 extend in operation away from the strip 114 inwardly in a downwardly and upwardly inclined position respectively, and viewed parallel to the rotary shaft 90 the center lines of the chains 112, 115 and 116 coincide, in operation, and extend in a radial direction.

Near each end of a strip 114 is thus fastened one pair of chains 115 and 116. A pair of tines 36 (see FIG. 11) is fastened near a pair of chains 115 and 116 and from the sectional view of FIG. 12 it appears that such a group of tines is fastened by means of a bolt 120 located approximately halfway up the strip 114 to the inner side of said strip, the mode of fastening being, if desired, the same as that shown in FIG. 3. The outermost tip of the lower tine of the group 36 projects, in this embodiment and viewed parallel to the rotary shaft 90 beneath the lower edge of the wall 34.

By means of the bolt 118 (see FIG. 13) a wear-resistant strip 121 may be fastened beneath the lower side of the lower flange of the stiffening strip 114. This wear-resistant strip 121 may be made from wear-resistant material, for example, hardened steel or wear-resistant synthetic resin. As compared with the thickness of the strip 114 its thickness may be fairly large. The wear-resistant strip 121 covers, viewed in the elevation of FIG. 11, the same circumferential angle as the stiffening strips 110 and 114 and is therefore lacking in the region between two strips 110 or two strips 114.

As stated above in principle it is desirable to provide the wall 34 with projections which provide an improved grip of the wall 34 on the crop during the rotary and linear movement of the wall, the function of said tines being, therefore, different from that of the tines of known rake members. Apart from the fairly short tines 36 the rake member 89 (FIG. 11) has angle-section fillets 122 of sheet material arranged on the outer side of the wall 34, the longitudinal direction of which is, at least in operation, parallel to the rotary shaft 90, one limb being approximately at right angles to the outer surface of the wall 34. In the embodiment shown the height of the limb at right angles to the wall surface is about 20 to 30 percent of the length of the tines of the groups 36. It should be noted that the tines 36 in this embodiment may extend in a radial direction. Between each pair of groups of tines 36 a projection formed by an angle-section fillet 122 is provided, which is located, viewed in the direction of rotation G, nearer the group of tines 36 located behind it than the group of tines 36 located in front of it. Between two groups of tines 36 an angle-section fillet 122 is arranged so that it can be fastened to an intermediate stiffening strip 114, but further angle-section fillets 122 are fastened to non-stiffening wall portions.

In operation, the rake member 89 is driven through the auxiliary shaft connected with the tractor 2, the input shaft 96, the gear wheels 97 and 98 and the hub 99, the two supports 102 and 107 being then rotated. The lower rim of the wall 34 moves in operation at a short distance above the ground so that the outermost tip of the lower tine of each group 36 is just located above the ground along its entire path or at the lower point of its path. Like in the preceding embodiments, the crop is pushed forwardly and laterally by the lower strip of the wall 34 in the direction of rotation G, while the groups of tines 36 and the angle-section fillets 122 improve the grip of the wall 34 on the crop. The crop is displaced laterally until it has reached a point nearest the swath board 93, where the crop is braked by the ground and is deposited in the form of a sharply defined swath. The tines are preferably in a trailing position. For tedding the crop it is only necessary to tilt up the swath board (fan-like dispersion). This sharply defined swath is obtained on the one side by the swath board 93 and on the other side, i.e., the inner side by the wall 34 operating in this case of a moving, here rotary, swath board, which is capable like a stationary swath board of producing a sharp definition of a swath. Like in the preceding embodiments the wall 34, when encountering unevennesses of the ground, is capable of "indenting" in a radial direction or of folding upwardly with respect to the surrounding wall portions in an axial direction. In this embodiment larger wall portions will deflect flexibly with respect to other wall portions than in the preceding embodiments. Since larger portions of the wall 34 are reinforced by the stiffening strips 114 so that these stiffened wall portions can move relatively to wall portions located in between two stiffening strips 110, viewed in the elevation of FIG. 11, but, as seen from FIG. 12, they are also capable of moving relatively to flexible wall portions located above the portion stiffened by the strip 114 (that is to say the portions above the strips 114 and below the associated strips 110). Depending upon the choice of flexibility of the wall 34 the stability of the projections (the groups of tines 36 and the angle-section fillets 122) with respect to the wall substrate can be improved by local reinforcement, while the separately stiffened wall portions can nevertheless elastically deflect relatively to one another.

Figure 15:
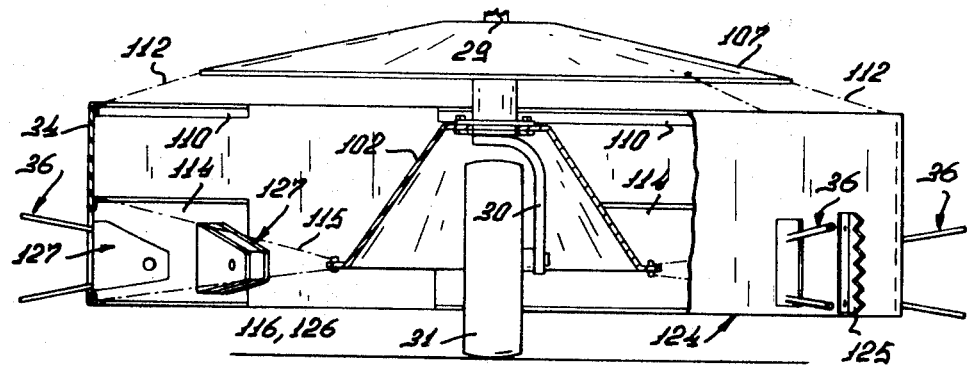
FIG. 15 is an elevation and partly a sectional view of one of the rake members in the direction of the arrow XV in FIG. 14.

The embodiment shown in FIG. 14 comprises two rake members 123 and 124, which are drivingly journalled on a frame (not shown) and which are moved by the tractor 2 in the direction H and driven in opposite directions J and K respectively so that the portions of the two rake members located between the two rotary shafts 90 move to the rear. The paths described by the tips of the tines of the groups 36 do not overlap one another in this embodiment. The parts of the embodiment shown in FIG. 14 having the same shape, disposition and function as those of the preceding embodiment are designated by the same reference numerals. In this embodiment the groups of tines 36 are arranged on the wall 34 by means of tine fasteners 127. Between two groups of tines 36 a projection 125 is arranged at the same place as in the preceding embodiment. This projection is generally shaped in the form of an axial angle-section fillet, whose limb projecting from the wall 34 is provided with a series of notches so that the outer edge of said limb is serrated (FIG. 15). A non-stiffened portion of the wall 34 is provided with at least one projection 125, fastened to the wall 34, for example, in the manner shown in FIG. 3.

In order to stabilize the position of the wall 34 with respect to the supports 102 and 107 in the direction of rotation each group of projections on the wall 34 formed by the groups of tines 36 and a group of projections 125 on the support 102 have arranged between them a non-radial, flexible element formed by a steel wire, a nylon wire or a chain 126, exposed to tensile force and coupled from the lower limb of one of the strips 114, that is to say at the foremost end thereof, viewed in the direction of rotation K with the fastening point on the flange 109 of the support 102 which is located radially with respect to the hindmost end of the foremost stiffening strip 114, viewed in the direction of rotation. The flexible connection formed, for example, by the chain 126 may, of course, also be arranged from the foremost end of the upper flange of the stiffening strip 114, viewed in the direction of rotation to the said fastening point of the support 102 and alternatively from the two limbs of the strip 114. In this way the movement of the wall 34 and of all parts fastened thereto is limited with respect to the supports 102 and 107 and the hub in the direction of rotation in operation in one sense so that the chain 126 constitutes a means of controlling the tangential wall deformation, while lagging behind of the lower rim of the wall relative to the further portion thereof due to forces exerted by the ground and the crop is avoided (such deformation would give rise to an undesirable upward movement of the lower rim in the case of heavy crop).

Figure 16:
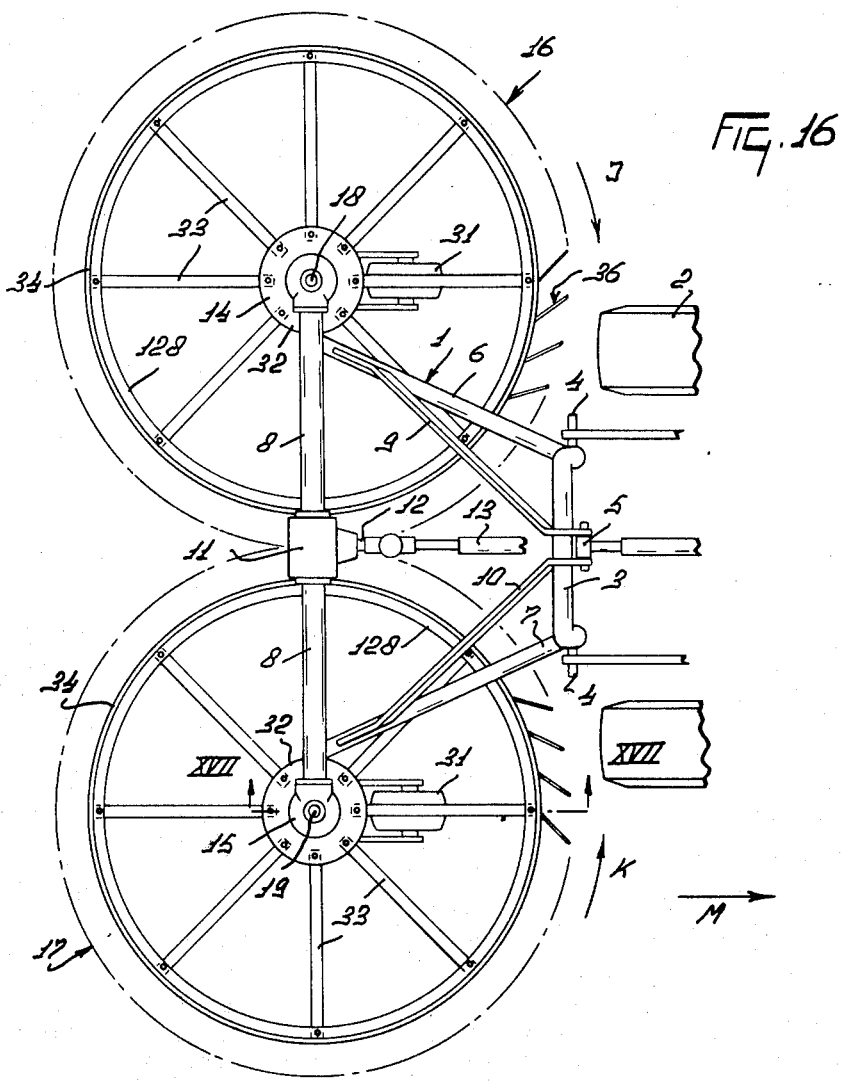
FIG. 16 is a plan view of a further embodiment of a machine embodying the invention, attached to a tractor.

The machine shown in FIG. 16 comprises parts whose shapes, dispositions and functions correspond with those of FIG. 1 and which are therefore designated by the same reference numerals. A difference resides in that the center line of the frame beam 8 of FIG. 16 is at right angles to a line extending in the direction of movement H. The supporting tube 6 of FIG. 16 has, therefore the same length as the tube 7. A further difference from FIG. 1 is that the directions of rotation J and K of the rake members 16 and 17 are opposite one another (see FIG. 14). The FIG. 16 shows a raking device similar to the FIG. 1 device consisting of two identical parts located on the rear of the machine, viewed in the direction of movement M but disposed symmetrically to the longitudinal plane of symmetry of the machine in the direction of movement M.

The following descriptions of various embodiments of the machine illustrated in FIG. 16 apply to both the rake members 16 and 17.

The rake member 17 shown in FIG. 17 again comprises a hub 28 rotatably journalled like in FIG. 1 on the rod 29, to which by means of the wheel carrier 30 inclined downwardly in the direction of travel M, is fastened the ground wheel 31. The ground wheel 31 is adjustable in a direction of height in a manner not shown and fixable in a plurality of positions. Near the lowe end of the hub 28 the annular flange 32 is welded in a position coaxial to the rotary shaft 19. At a plurality of places — for example, eight — on the periphery of the flange 32 eight supports 33 are bolted to the circumference of the flange 32 at equal intervals. The supports 33 like those of FIG. 1 may be made from rod-shaped spring steel, but they may also be formed by rigid, tubular parts. In order to restrict the transport width of the machine the supports may include a pivotal joint or they may be completely flexible, for example, in the form of chains. The ends of the supports 33 remote from the hub 28 are bolted to a felly-like ring 128, which is formed by U-profiles, the free ends of the limbs of which are orientated towards the inner side of the rake member 17. The supports 33 are fastened near the upper limb of the ring 128. On the outerside of the web of the ring 128 circular wall 34 is fastened by bolts. It should be noted that the ring 128 may also be formed by an angle-section iron, one of the limbs extends parallel to a plane at right angles to the rotary shaft 19. To this limb are secured the spokes or supports 33. To the other limb of the ring 128 located coaxially to the rotary shaft 19 is fastened the fexible, circular wall 34. On the lower side the wall 34 is reinforced and furthermore stiffened with the aid of a strip 129 attached all around to the inner side of the wall 34 by bolts, glue, wire or nails, said strip extending upwardly away from the lower edge of the wall 34 near the ground along the wall 34 up to a point spaced from the lower edge by a distance equal to 20 to 40 percent of the overall height of the wall 34, preferably equal to about 30 percent. It should be noted that the strip 129 may, as an alternative, be disposed on the outer side of the wall 34, while it is furthermore possible for the wall 34 to join the top side of the strip 129, these two parts overlapping one another over only a very small distance, the strip 129 fulfilling at the same time the function of a wall. The strip 129 is preferably made of cloth or strip material having a markedly lower flexibility than the wall 34 and it may be made from reinforced rubber, synthetic resin or canvas, but with regard to wear by the ground contact it may be made from metal parts or plateof chain material.

Along the whole circumference of the lower side of the wall 34 reinforced by the strip 129 the groups of tines 36 are arranged by means of bolts. The number of groups of tines 36 arranged at regular intervals along the circumference of the wall 34 is in this embodiment 32. The two tines of each group are parallel to a vertical plane and are spaced apart by a distance equal to about 60 percent of the height of the strip 129. The shape of the tines of the groups 36 is similar to that of the groups of tines in the preceding embodiments.

Figure 17:
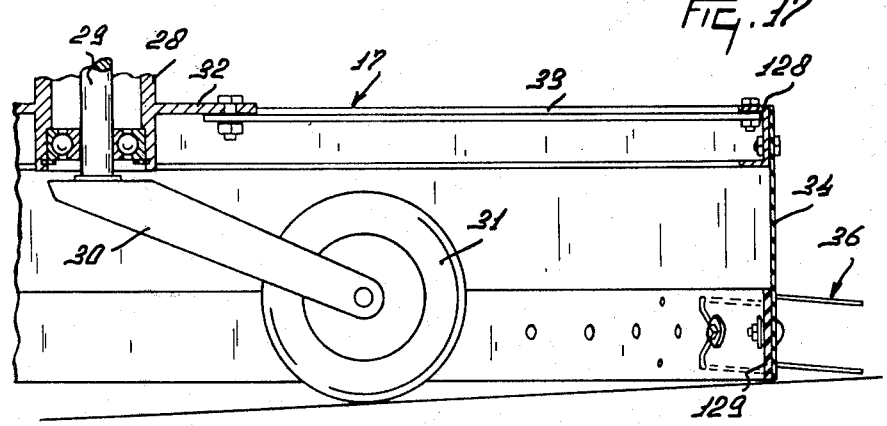
FIG. 17 is a sectional view taken on the lines XVII—XVII in FIG. 16.
Figure 18:
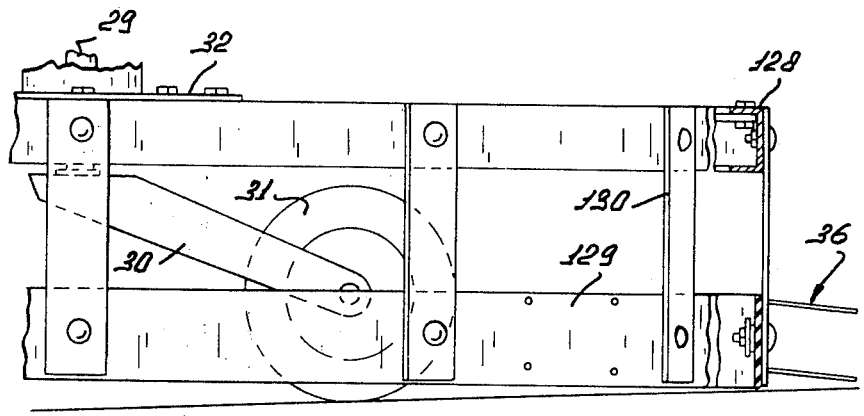
FIG. 18 is partly an elevation and partly a sectional view taken on the lines XVII—XVII in FIG. 16 of a further embodiment of a rake member.

In the embodiment shown in FIG. 18 the ring 128 has bolted to it at regular intervals a plurality of strip-shaped elements 130—for example, twelve — to the web of the ring 128. These elements 130 may be formed by leaf springs or synthetic resin strips and are hanging down to near the ground and are rigidly fastened to the ring 128. The sectional area of the elements 130 is proportioned so that they flexibly damp the forces exerted on the rake member. In a manner similar to that illustrated in FIG. 17 the strip 129 operating like a wall is fastened near the lower side of the elements 130 on the inner side thereof by means of bolts, which also serve to fasten the groups of tines 36. The strip 129 serves as a felly for the groups of tines 36. The disposition and fastening of the strip 129 and of the groups of tines 36 are identical to those of the embodiment shown in FIG. 16.

Figure 19:
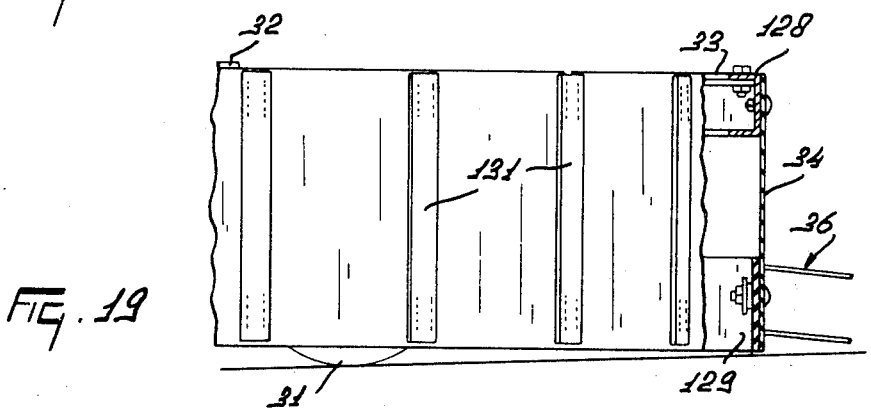
FIG. 19 is partly an elevation and partly a sectional view taken on the lines XVII—XVII in FIG. 16 of a further embodiment of a rake member.

In the embodiment shown in FIG. 19 the wall 34 of FIG. 17 is reinforced and furthermore slightly stiffened by flexible strips 131, which are fastened at regular intervals to the periphery of the wall 34 so that the longitudinal axes of the strips 131 extend substantially parallel to the rotary shaft 19 along the wall 34. These strips 131 may be fastened to the inner or outer side of the wall 34 by glue, bolts or wires. The number of strips in the embodiments shown in FIG. 19 amounts to 32. In the region between two strips 131 a group of tines 36 is fastened to the portion of the wall 34 reinforced by the strip 129.

In the embodiment shown in FIGS. 20 and 21 the end of the support 33 remote from the hub 28 is enveloped by several turns of a rod-shaped spring steel wire 132, whose end facing the hub is clamped tight by means of a clamp 133 to the support 33, whereas the other end of the wire 132 extends, viewed on plan, away from the support 33 at least substantially tangentially to the rotary shaft opposite the direction of rotation along the wall 34 in a manner such that, in a radial view, the wire 132 is at an angle of preferably 45° to a plane at right angles to the rotary shaft, while the free end of the wire 132 is bent over so that it is parallel to said plane. The free end of the wire 132 is passed through an eyelet 134 on the inner side of the strip 129 (FIG. 21), said eyelet constituting a joint for the free end of the wire 132 extending tangentially and parallel to said plane on the one hand and for the wall 34 on the other side. The overall length of the end of the wire 132 extending along the wall 34 is about 40 percent of the length of the radius of the rake member. The eight supports 33 are preferably all provided with such a spring. The disposition and fastening of the further parts of the rake member correspond with those of the embodiment shown in FIG. 17.

In the embodiment shown in FIG. 22 the spring steel wire 135, which is fastened in the manner shown in FIG. 20 to the support 33, extends initially at the end remote from the hub 28 tangentially to the rotary shaft 19 along the inner side of the wall 34 over a distance equal to about 20 percent of the radius of the rake member against the direction of rotation K; it is passed through an elongated hole in the wall 34 to the outside, where it extends over a distance of about 20 percent of the radius of the rake member tangentially along the outer side of the wall 34. This end of the wire 135 is, viewed in a radial direction, at an angle of about 45° to a plane at right angles to the rotary shaft 19. The free end of the wire 135 is bent over through an angle of 135° so that it terminates in a substantially horizontal position, while near this end it is clamped to the wall 34 by means of a clamp 136. Like in FIG. 20 each support of the rake member 17 may be provided with such a spring structure. The spring construction may, however, also be arranged on only a number of regularly spaced supports 33. The disposition and fastening of the further parts of the rake member are identical to that described for the preceding embodiments.

Figure 23:
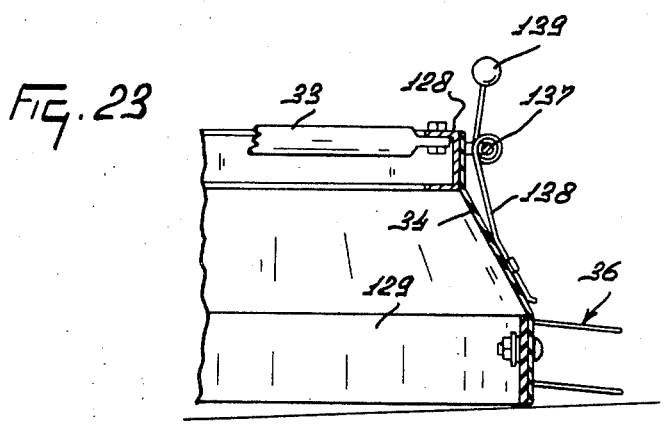
FIG. 23 is a sectional view of the further embodiment of the FIG. 16 rake member.

In the embodiments shown in FIG. 23 a semi-circular bracket 137 is arranged on the side of the ring 128 remote from the hub 28, said bracket being bent around a center line parallel to the rotary shaft, a rod-like spring steel wire 138 being wound a few turns around the bracket, in this embodiment two turns. One free end of the wire 138 extends upwardly and has a weight 139 at the top, whereas the lower end of the wire 138 extends downwardly along the wall 34 and terminates just above the wall portion stiffened by the strip 129. The wire 138 is fastened to the wall 34 by means of at least one clamp. In the rest position the lower side of the wall 34 and the strip 129 are hanging down in folds. In operation, the centrifugal force unfolds the lower side of the wall 34 and the strip 129, which are stretched taut as a result of which the tension of the spring steel wire 138, also by the action of the centrifugal force on the weight 139, assumes such a value that the portion of the wall 34 located between the portion fastened to the ring 128 and the portion stiffened by the strip 129 extends parallel to a conical surface, the apex of which is located above the flange 32 on the axis of rotation and the axis of which coincides with the rotary shaft 19, the vertex being about 20° to 40°. The arrangement and connections of the further parts of the rake member are similar to those described in the preceding embodiments.

In operation the flexible wall 34, the elements 130 and the strip 129 shown in FIGS. 16 to 23 move into the operational position by centrifugal force, the whole wall assuming the cylindrical shape. The supports 33, if they include flexible portions, will adjust themselves in a fairly stable manner owing to this centrifugal force and also under the action of the mass of the ring 128 on the outer edge in a position approximately at right angles to the rotary shaft. The lower edge of the flexible wall 34 or the strip-shaped element 130 and the strip 129 move along the ground in a rotational movement and in the direction of travel M. The lower side of the wall 34, rotating about a substantially vertical axis is located with the strip 129, throughout its circumference at least in these embodiments directly above the ground and the crop encountered by this lower side is displaced inwardly by the wall while the lower edge slides along the ground in a linear and rotational movement. The flexible wall 34, 129, 130 itself is consequently a crop-displacing member. The lower portion of the wall stiffened by the strip 129 is furthermore provided with a plurality of projections formed by groups of comparatively short tines 36.

When encountering unevennesses of the ground or obstacles, the wall 34 of FIG. 17 will deform in upward direction and will require a period of time to return to the operational position proper. In this period of time the hay-making effect of the rake member could partly be lost under given conditions. The raking results may be improved by arranging the stiffening strip 129 in the rake members which strip ensures that the lower side of the wall 34 remains near the ground surface, the unevennesses of the ground or obstacles being compensated for by the readily deformable portion of the wall 34 located between the ring 128 and the strip 129. The wall 34 is capable of folding up mainly in a direction parallel to the rotary shaft. The strip 129 prevents in addition excessive wear on the lower side of the wall 34. Moreover, the strip 129 provides a satisfactory place for fastening the groups of tines 36.

In order to suppress the reaction of the rake member at the collision with unevennesses of the ground or obstacles and particularly in order to prevent a tangential displacement of the lower wall rim with respect to the top rim thereof (the lower edge would move upwardly in an undesirable manner), strip-shaped leaf spring elements 130 shown in FIG. 18 are employed along the whole height of the outer surface of the rake member. By using leaf springs the rake member can hardly loose contact with the ground, while owing to their rigid fastening the elements 130 control the wall deformation in a radial, an axial and particularly a tangential direction.

FIG. 19 illustrates an improved adaptation of the rake member to unevennesses of the ground or obstacles by stiffening the wall 34 in a direction of height on the outer side by means of flexible strips 131. This has the advantage that the raking effect of the wall 34 is enhanced by the arrangements of strips on the outer side.

In the constructions shown in FIGS. 20 to 23 the lower side of the wall 34 responds in a damped manner to the encounter with heavy crop, unevennesses of the ground or obstacles by the action of the springs 132, 135 and 138. These springs are capable not only of moving in a radial direction (like the strip-shaped leaf spring element 130 of FIG. 3) but also in an axial direction. This permits the lower side of the wall 34 of effectively matching unevennesses, while a satisfactory raking effect is invariably ensured. By displacing the free ends of the springs 132 or 135 in the clip 133 in a radial direction along the support 33 a pre-tension can be obtained in a radial direction. The same may be achieved in an axial direction by turning the clip 133 around the support 33 and by fixing it in the turned state. The action of the springs 132 or 135 can thus be adapted to the conditions of the crop and the ground surface. The springs 132, 135 and 138 suppress the folding effect in the wall 34. Fastening the strips on the outer side of the wall 34 as shown in FIG. 22 appears to reduce soiling of the portion of the spring 135 lying on the wall.

The wall 34 and the strip 129 of FIG. 23 are hanging down in folds near the lower side in the rest position. The spring steel rod or wire 138 of FIG. 23 urges, in operation, the portion of the wall 34 to which the end of the wire 138 is secured into a stable state since under the action of the centrifugal force the weight 139 urges the wire portion near the lower end against the wall 34 so that the wall is stiffened and folding up is suppressed. Moreover, by adjusting the number of revolutions of the rake member this pressure of the spring wire 138 can be controlled.

It should be noted that the rod 132 (FIG. 21), 135 (FIG. 22) or 138 (FIG. 23) prevents "winding-up" of the flexible wall 34 by friction near the lower side, so that an undesirable displacement of the lower edge is eliminated.

The hay-making machine shown in FIG. 24 comprises a frame 137, in which a rake member 138 is adapted to rotate about an upright rotary shaft 139, which is inclined upwardly and forwardly, viewed in the direction of travel or which is approximately vertical in operation in accordance with the structural features of the rake member 138 and/or the nature of the crop to be displaced. The frame 137 comprises a trestle 140 shaped in the form of an inverted U, viewed in the direction on of travel M, the two free ends on the lower side of the trestle 140 having fastening means 141 for the attachment to the lower arms of the lifting device of a tractor moving the machine, whereas near the top of the trestle 140 fastening means 142 serve to attach the machine to the top arm of the three-point lift of the tractor. From the free ends of the trestle 140 supporting tubes 143 converge rearwardly, viewed on plan and together with the trestle 140 said tubes 143 form essentially an isosceles triangle, as viewed in the elevation of FIG. 24, the base being transverse of the direction of movement M at the front of the machine. The rear ends of the two supporting tubes 143 are secured to a gear box 144 accommodating the drive of the rake member 138 and from a place on the trestle 140 near the fastening means 142 a supporting tube 145 is inclined rearwardly and downwardly, the hindmost point of said supporting tube 145 being also secured to the gear box 144. Viewed in the elevation of FIG. 24 the center line of the supporting tube 145 coincides with the perpendicular of said triangle in the direction of travel M.

To the gear box 144 and also to the rear ends of the supporting tubes 143 and 145 is secured a transverse beam 146, extending transversely of the direction of movement M and having a length slightly exceeding the diameter of the rake member 138. The transverse beam 146 is bent over at both ends in forward direction and thus forms two tubular brackets 137 one on each side of the machine, the front sides of said brackets being again bent over towards the trestle 140 so that supports 148 are formed. The brackets 147 are thus located beyond the circumference of the rake member 138 and togetherwwith the transverse beam 146 and the supports 148 they provide protection against the rotating rake member.

Along the geometric axis of rotation 139 a shaft is provided which is stationary with respect to the frame 137 and on the bottom side of this stationary shaft ground wheels 149 are arranged in mirror-reflection beneath the rake member so as to be located one on each side of the vertical longitudinal plane of symmetry of the machine in the direction of movement M. In operation, the ground contact points of the wheels are located in front of a vertical plane transverse of the direction of movement M going through the point of intersection of the rotary axis 139 and the ground surface.

The ground wheels 149 are adjustable in a direction of height in known manner (not shown). In this way the slop of the rake member 138 to the ground surface can be varied and fixed in a plurality of positions.

The rake member 138 of the machine shown in FIGS. 24 to 26 is provided with a flexible wall 34, for example, of cloth, rubber or synthetic resin with or without reinforcements. The lower side of this circular, closed wall extends down to the ground surface so as to form a crop-displacing member whose lower side is capable of matching in a particularly flexible manner in a radial and/or an axial and/or a tangential direction the unevennesses of the ground. The crop lying on the ground in a layer or in the form of a swath is pushed on by the rake member moving in the direction of travel M and rotating in the direction N by means of the flexible wall, while it is pushed away in the direction of rotation N to a place located on the left-hand side of the rake member (see FIG. 24), where the crop leaves the wall and is deposited in the form of a swath. In this embodiment the wall is folded in a controlled manner over part of its substantially cylindrical surface, whereas the further portion of the surface is stretched. The rake member is to this end constructed as follows.

The flexible wall 34 is suspended by its top side to a circularssupporting member 160, which is fastened to the hub of the rake member 138 with the aid of spokes 151. It should be noted that the spokes 151 are rigidly secured to a hub part which is adapted to turn about the rotary shaft and to be fixed in a plurality of positions.

The spokes 151 and the supporting member 150 do, therefore, not rotate in operation. The supporting member 150, which is substantially annular viewed on plan, is built up from two adjacent profiles imparting to the supporting member in a radial direction a substantially U-shaped sectional area, in the center of which an opening is provided all around, through which are passed the fastening means to which the flexible wall 34 is suspended. The limbs of the U extend upwardly and the distance between them, measured in a radial direction has two different values (FIGS. 24, 25). Over approximately half the circumference of the supporting member 150 the distance between the upright limbs of the U is approximately equal to 12 to 20 percent of the radius of the rake member 138, whereas over the other half of the circumference said distance is equal to about 3 to 5 percent of the radius of the rake member. The wider part of the supporting member 150 is located nearer the front side of the machine and partly on the right-hand side, viewed in the direction of travel, and slightly on the left-hand side, whereas the narrow part of the supporting member is located near the rear side and partly on the left-hand side, at least in the arrangement shown in FIG. 24. Since, as stated above, the U-shaped section is open between the two limbs, the supporting member may also be considered to consist of two coaxial angle-section profiles 152, 153 and 154, 155 respectively in which a flange of the profile 152 and a flange of the profile 153 (154 and 153 respectively) are parallel to the rotary shaft, the latter flanges forming the upright limbs of the U-profile. The space between the angle profiles 152 and 153, and 154, 153 respectively is open throughout the circumference (FIG. 25) so that the angle-section profiles 152 to 154 are fastened in a manner not shown to the top sides of the upright flanges or limbs to the ends of the spokes 151 remote from the gear box 144. The supporting member 150 may be completely on the top side in order to prevent penetration of dust and soil.

The space between the angle-section profiles 152 to 154 accommodates a chain 155 formed by a large number of links 156, which are relatively pivotable about pivotal shafts 157 extending parallel to the rotary shaft of the rake member 138 (FIG. 25). A roller 158 is freely rotatable about each pivotal shaft 157 between two links 156. The rollers 158 bear either on the top side of the horizontal flanges of the profiles 153 and 154 and are guided radially by the upright flanges of said profiles or on one of the horizontal flanges of the profiles 152 or 153 and are then guided in a radial direction by the upright flange of the profile 152 or 153 concerned. The material of the flexible wall 34 is suspended by means of supporting members (not shown) (for example, steel bars having eyelets at both ends) to the lower sides of all pivotal shafts 157, which as stated above these suspension members project downwards through the circular gap between the adjacent angle-section profiles 152, 153 and 154, 153 respectively.

Viewed in the direction of travel M and in the direction of rotation N a driving gear 159 is arranged near the right-hand side and near the rear side of the rake member (FIG. 24). For this purpose the angle-section profile 154 and the angle-section profile 152 terminating at a distance from the former are prolonged inwardly to form a supporting member 160, which extends mainly in a radial direction. The supporting member 160 comprises two tangentially spaced upright flanges 161 and 162, which are interconnected on the lower sides by a plate 163, which is integral with said flanges and which extends parallel to a plane at right angles to the rotary shaft of the rake member. Near the circumference of the rake member the flange 161 joins the upright flange of the profile 154 and the flange 162 joins the upright flange of the profile 152. The flanges 161 and 162 are spaced apart from one another near the central part of the rake member and are approximately parallel to one another, whereas near the supporting member 150 they widen up so that they diverge outwardly and join the supporting member 150 in the manner described. Inside this widened part a driving wheel 64 is journalled in the plate 163 and is rotatable about a rotary shaft 165, which is parallel to the rotary shaft of the rake member 138. The driving wheel 164 is provided with a plurality of outwardly projecting tine-shaped extensions 166 — in this embodiment-- which are shaped so that they can come into contact with the neighboring links 156 of the chain 155. Each link 156 comprises two superjacent strips interconnected near their ends by pivotal shafts 157. The distance between the two strips of each link 156 is such that an extension 166 of the driving wheel 164 can fit between said two parts so that the extension bears on the associated pivotal shaft 157, the chain 155 being thus moved in the direction of rotation N.

It will appear from FIG. 24 that an adjusting strip 167 is rigidly arranged with respect to the frame of the machine in a position coaxial to the rotary shaft of the rake member 138. Said strip has a plurality of holes 168. At the same radial distance from the rotary shaft of the rake member 138 the plate 163 of the supporting member 160 has a hole. As stated above, the spokes 151 and the supporting member 150 are adapted to turn about the rotary shaft. By passing a locking pin 169 through one of the holes 168 and through the hole in the plate 163 the assembly of spokes 151 and the supporting member 150 can be adjusted in different positions relative to the machine frame and fixed therein. The gear box 144 comprises a driving wheel (not shown), which is drivingly connected with the input shaft 144A and is rotatable about the rotary shaft of the rake member. The rotary shaft 165 of the driving wheel 164 is furthermore provided with a wheel 170. The wheel 170 can be driven by the driving wheel with the aid of a driving chain 171 (FIG. 25).

From FIG. 26 it will be seen that the flexible wall 34 is provided on the outer side with a comparatively large number of outwardly projecting tines or groups of tines 36, which are in trailing positions relative to the direction of rotation N and extend parallel to a plane which is at an angle of about 30° to a tangential plane to the wall 34 at the area of the fastenings of the tines. The groups of tines 36 are fastened so that said angle is maintained under any condition in operation.

In operation, the machine is attached with the aid of the fastening means 141 and 142 to the lifting device of a tractor propelling the machine and the input shaft 144A is drivingly connected through an auxiliary shaft with the power take-off shaft of the tractor. The driving wheel adapted to rotate about the rotary shaft of the rake member 138 drives by means of the chain 171 and the wheel 170 the wheel 164 provided with the extensions 166. Since one of the extensions 166 constantly bears on one of the pivotal shafts 157 of the chain 155 (exerting pressure on the roller 158 surrounding the pivotal shaft 157), the chain 155 is driven in the direction of rotation N.

The exploded length of the chain 155, measured along the links 156, and the exploded length (the circumferential length of the wall 34 measured along the surface of the cloth) exceed the circumference of the supporting member 180. When the chain 155 is driven by the driving wheel 164, it is compelled to fold up along at least part of the circumference of the supporting member 150 in order to eliminate the difference in length between the chain and the circumference of the supporting member 150. This folding is allowed in the region of the supporting member 10 limited by the angle-section profiles 152 and 153, whose relative distance in a radial direction is fairly large. In this region the links 156 fold together to some extent as is shown schematically in FIG. 24 and in detail in FIG. 25. If desired, guide strips may be arranged in the region between the profiles 152 and 153 for preventing the upwardly prolonged shafts 157 located on either side from approaching one another. These guide strips are then also fastened to the suspension gear of the profiles 152 and 153. In this way the rollers 158 are prevented from gliding off the horizontal limbs of the profiles 152 and 153. Owing to said partial folding of part of the links 156 the flexible wall 34 will also fold up since the upper rim of the wall 34 is suspended to the lower side of the pivotal shaft 157. The zigzag line in FIG. 24 is therefore not only characteristic of the shape of the chain 155 but also of the shape of the folded wall 34 in the region concerned. Near the reference numeral 173 (FIG. 18) the trajectory formed by the angle-section profiles 152 and 153, where the chain 155 folds up, terminates in a restriction having a smooth run, viewed in the direction of rotation N, after which the supporting member again has the shape and dimensions as shown in FIG. 25 by the arrangement of the angle-section profiles 153 and 154. Owing to the drive of the driving wheel 164 the chain is stretched in the narrow region of the supporting member 150 between the angle-section profiles 153 and 154, whereas viewed in the direction of rotation N the chain is pushed on after having passed beyond the driving wheel 164 so that it folds up as well as the wall 34 suspended to the chain 155 in this region. Consequently, the wall 34 assumes in a controlled manner a corrugation-like appearance near its lower side and (FIG. 24) near its right-hand side and its front side. This shape may, if desired, also be produced at a distance below the upper edge of the wall 34, for example, by arranging at a distance above the lower edge a second set of angle-section profiles 152 to 154, chains 155 and, if necessary, a second wheel 164 to be driven through the shaft 165. Said corrugations form valleys in which during propagation and rotation of the rake member the crop can be temporarily stored. The crop stored in these folds is carried around the wall 34 in the direction of rotation N, while at a place near the reference numeral 173, the wall 34 is stretched by the then taut chain 155 so that the crop held in the folds of the wall is loosened, since the local smooth wall can no longer carry along the crop. Consequently, owing to the folds the wall itself can retain the crop to a large extent. When under particular conditions or in the event of various kinds of crop the wall could not fully accomplish said task it is advantageous to provide tines or groups of tines 36 near the lower side of the wall (FIG. 26). These tines or groups of tines 36 then contribute materially to the engagement and retention of the crop, which attaches not only to the tines but also stays in the intermediate folds of the wall 34 so that a very high receiving capacity is obtained. When the wall 34 is stretched near the place 173, the crop is urged out of the folds and the tines occupying a substantially radial position in the folded region of the wall are automatically turned into a sharply sloping position by unfolding of the wall so that also the crop sticking to the tines is ejected. In the manner described above a hay-making machine comprising a flexible wall is obtained, in which in the region in which the crop is thrown up extensions (folds, tines) are automatically formed, which carry the crop along, while at the desired place the wall can assume a state in which the crop is released. By inserting the locking pin into one of the further holes 108, the folding region of the wall 34 and the place of release of the crop can be varied by turning the whole supporting member 150 about its rotary shaft and by fixing it in the new position.

Figure 27:
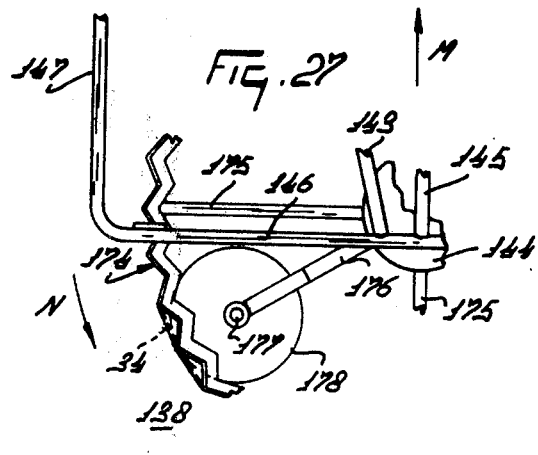
FIG. 27 is a plan view of part of the circumference of the rake member in a machine embodying the invention.

In the embodiment shown in FIG. 27 a felly-like supporting member 174 is fastened by means of spokes 175 to the rotatable hub of the rake member. The supporting member 174 is an angle-section profile, one of the limbs of which is parallel to the rotary shaft. Viewed in a direction parallel to the rotary shaft of the rake member 138, the supporting member has a zigzag shape along the circumference. To the upright limb of the angle-profile 174 is bolted or clamped a wall 34 of flexible material, for example, sailing-cloth, rubber, armoured synthetic resin or the like. This wall hangs down to the ground and since it is flexible in all directions it can perfectly match the unevennesses of the ground, while during the forward and rotational movement of the wall the crop is displaced forwardly and laterally in the direction of rotation N up to the place where the crop leaves the wall in the form of a swath. To the gear box 144 is secured, viewed in an axial direction, a radially extending extension arm 176, which is adjustable in a tangential direction and can be fixed in a plurality of positions relative to the direction of movement M. Owing to the zigzag-shape of the supporting member 174 the flexible wall 34 hangs down in folds from this supporting member 174, the crop being collected near one side and near the front side of the machine in the valleys of the folds near the lower side of the wall 34 so that the crop is conveyed in the folds in the direction of rotation N.

Near its free end, the extension arm 176 is provided with a rotary shaft 177 extending substantially parallel to the rotary shaft of the rake member 138. Beneath the extension arm 176 a pressing roller 178 is freely rotatable on the rotary shaft 177. The diameter of the pressing roller 178 is chosen so that viewed in an axial direction the point of the pressing roller 178 farthest remote from the rotary shaft of the rake member 138 is spaced apart from the rotary shaft of the rake member 138 equal to or larger than the distance of the point of the supporting member 174 farthest remote from the rotary shaft of the rake 138 from said rotary shaft. In operation, the crop is carried along in the valleys between the folds of the wall 34 in the direction of rotation N. At the place of the pressing roller 178, located near the lower side of the wall 34, viewed in an axial direction, the roller comes into contact with the inner side of the wall moving along the roller so that in view of the location of the outermost points the roller will smooth down the corrugations of the wall produced in the direction of the rotary shaft of the rake member 138 so that the crop compulsorily leaves the folds of the wall. It is thus ensured that the crop is virtually deposited by the machine at the desired place.

In the embodiments shown in FIGS. 28 to 42 a large number of groups of tines 36 are arranged along the whole circumference of the lower edge of the wall 34 of FIG. 17. The number of groups of tines arranged at equal intervals along the circumference of the lower side of the wall 34 may be thirty-two. In this embodiment, the two tines of each group 36 are located obliquely one above the other so that viewed in the direction of rotation K, the upper tine 179 is located in front of the lower tine 180 of the same group 36. The tines 179 and 180 of one group 36 are secured by means of a bolt 181 to the wall 34 and the stiffening rim 129. The bolt 181 passes in a radial direction through a hole in the wall 34 and in the stiffening rim 129. It should be noted that the wall 34 and the reinforcement rim 129 are secured to one another, for example by glue or stitches or by both.

The portion of the bolt 181 projecting inside the stiffening rim 129 is surrounded over about 120° by a curved portion 182 (FIG. 29) of a tine holder of the two tines 179 and 180. The curved portion 182 is prolonged at its top end in a tangential portion 183 located at right angles to the rotary shaft and viewed in the direction of rotation K the portion 183 is located in front of the portion 182. The portion 183 located inside the stiffening rim 129 is joined by the upper tine 179. For this purpose the material is bent back through an angle of about 115° near the foremost end of the portion 183, viewed in the direction of rotation K so that the upper tine 179 is in a dragging position relative to the direction of rotation K. The round transitional portion between the portion 183 and the upper tine 179 is located at least partly in a hole in the wall 34 and in the stiffening rim 129. Away from the lower end of the curved portion 182 extends a portion 184 of the tine holder, which is inclined downwardly and forwardly, viewed away from the portion 182 in the direction of rotation K, it being at an angle of about 25° to 30° to the portion 183. The foremost end of the portion 184, viewed in a direction parallel to the rotary shaft 19, is also bent back through an angle of about 115°, it pierces the stiffening rim 129 and the wall 34 and terminates in the lower tine 180, which is in a dragging position parallel to the upper tine 179 relative to the direction of rotation. Viewed in a radial direction (FIG. 29), the two tines 179 and 180 are inclined downwardly to the rear away from their place of emergence from the wall 34 and they are at an angle of about 25° to 30° to a plane at right angles to the rotary shaft 19. Viewed in a radial direction the tip of the lower tine 180 projects slightly below the lower edge of the wall 34 and of the stiffening rim 129.

Between the portions 182, 183 and 184 of the holder of each group of tines 36 and the stiffening rim 129 or the wall 34 respectively, a plate 185 has the functions of a clamping plate and of a poise. Viewed in a radial direction (FIG. 29) the circumference of the plate 185 encloses the tine holder formed by the portions 182 to 184. The plate 185 has three holes, one for the bolt 181, one for the transitional portion between the portion 183 of the tine holder and the upper tine 179 and one for the transitional portion between the port on 184 and the lower tine 180. The tine 179, the portion 183, the portion 182, the portion 184 and the lower tine 180 are made from a single length of spring steel wire. One of the major surfaces of the plate 185 is in contact with the stiffening rim 129 or, if the stiffening rim 129 is located on the outer side of the wall 34, it is in contact with the wall 34. The portion 182 of the tine holder and at least part of the portions 183 and 184 are partly enclosed by a clamping piece 186 of sheet material, which engages the sides of said parts facing the rotary shaft, said piece having a rim bent over at right angles to the wall 34 through a circumferential angle of about 120° and joining the outer curvature of the portions 183 and 184 as far as they are located within the shell-like clamping piece 186. The tangential inner surface of the clamping piece 186 is pressed home by a nut 187 screwed onto the end of the bolt 181 facing the rotary shaft. The bolt 181 has at its other end a semicircular head 188, the contact surface of which bears on the outer side of the wall 34 or the outer surface of the stiffening rim 129, if the latter were arranged on the outer side of the wall 34. As shown in FIG. 29, the plate 185 has a substantially triangular shape. The bent-over rim of the lamping piece 186 facing the wall 34 can be urged by the nut 187 against the inner surface of the plate 185, but the dimension of the clamping piece 186, measured in a radial direction, may also be such that after the nut 187 is tightened, the portions 182, 183 and 184 are urged against the inner surface of the plate 185 via the clamping piece 186 without the bent-over rim of the clamping piece 186 being in contact with the plate 185.

In the embodiment shown in FIGS. 30 and 31, the plate 185 located between the tine holder of the portions 182, 183 and 184 and the stiffening rim 129 is omitted, the portion 182 and at least parts of the portions 183 and 184 being urged by means of the shell-like clamping piece 186 and the nut 187 directly to the stiffening rim 129. In this embodiment of weight 189 is arranged between each pair of adjacent groups of tines 36, said poise being formed by a square or rectangular sheet, which is clamped against the inner side of the stiffening rim 129 by means of a bolt 190. Like in the preceding embodiment, the major surfaces of the plate-shaped weight are parallel to the rotary shaft 19. Each weight 189 can be provided on the top side with a rim 191 of a thickness equal to or slightly smaller than the thickness of the stiffening rim 129, measured at right angles to the rotary shaft 19. The rim 191 projects outwardly from the weight 189 and the weight 189 is fastened to the stiffening rim 129 so that this projecting rim bears on the top edge of the stiffening rim 129 so that in operation a turn of the weight 189 about the bolt 190 is prevented. The weights 189 arranged on the rake member 17 and having the same dimensions and shapes may be removed and replaced by weights of a similar shape but having a smaller or greater weight. The weights 189 may have a smaller or greater thickness and/or they may be narrower or broader. The weights arranged on the rake member 17 have, however, the same weight. As a matter of course, the structures shown in FIGS. 28 and 29 and those of FIGS. 30 and 31 may be combined.

In the embodiment shown in FIGS. 32 and 33 the replacement of weights is facilitated. For this purpose the connection between the wall 34 and the stiffening rim 129 is interrupted at several places over a comparatively small length. At such an interruption of the connection two brackets 192 can be inserted between the wall 34 and the stiffening rim 129, the top sides of said brackets being provided each with a supporting part 193 extending parallel to a plane at right angles to the rotary shaft 19 and lying on the top edge of the stiffening rim 129 and being orientated inwardly. The inner ends of said supporting members 193 are provided each with a weight 194, the lower edges of which are located at the level of the lower edges of the wall 34 and of the stiffening rim 129. The weight 194 is in contact with the inner surface of the stiffening rim 129. For the rake member 17 several sets of weights provided with brackets 192 are available, the weight of one set differing from that of a further set. These weights 194 can be inserted between the wall 34 and the stiffening rim 129 in between two adjacent groups of tines 36. It is preferred to provide the brackets 129 near the lower end of the portion inserted between the wall 34 and the stiffening rim 129 with an inwardly bent-over tip 195, which can slightly penetrate into the outer surface of the stiffening rim 129 under the action of the spring tension of the associated bracket 192.

In the embodiment shown in FIGS. 34 and 35 pockets 196 are provided on the inner side of the stiffening rim 129 between two adjacent groups of tines 36. They may be fastened by gluing or stitching to the inner edge of the stiffening rim 129. Each pocket has a flap 197. Each pocket 196 and the associated flap 197 are made, for example, from canvas. Each flap 197 can be opened to insert a weight in the form of a steel plate or a lump of lead into the pocket. Then the flap can be closed, for example, by a button 198. All pockets of the rake member 17 have to be filled with plates of the same weight. These plates can be readily replaced by plates of a smaller or greater weight. In a further embodiment (FIG. 36) the connection between the stiffening rim 129 and the flexible wall 34 may be omitted throughout a strip along the whole circumference so that a kind of seam is formed whose boundaries are located and spaced apart from the top side and the lower side of the stiffening rim 129, viewed at right angles to the wall 34. This uninterrupted seam may be arranged so that viewed in a radial sectional area, the material of the flexible wall 34 is bulging over a distance corresponding to the height of the seam so that between the stiffening rim and the wall an uninterrupted, annular or hose-like space is formed. Into this space of the seam is inserted a lead wire 199 extending throughout the circumference of the rake member. By providing an opening at given places in the seam, for example, on the side of the wall 34 lead wires of different weights per unit of length can be inserted at will.

In the embodiment shown in FIGS. 37 and 38 a chain 200 extending along the whole circumference of the stiffening rim 129 is provided on the inner side of said rim. At relative distances corresponding with the distances between the bolts 181 the links of the chain 200 are provided by welding with suspension plates 201, the major boundary surfaces of which extend parallel to the rotary shaft 19. The plates 201 extend upwardly away from the chain and have each a hole at the top end for slipping the plate onto the corresponding bolt 181 to be fastened by means of the nut 187 to the associated clamping piece 186. The dimensions of the chain 200 and the length of the suspension plates 201 are such that the lower side of the chain 200 hanging beneath the bolts 181 is located at the same level as the lower side of the wall 34 and/or tie stiffening rim 129 or at a slightly lower level, viewed in a direction parallel to the rotary shaft 19. The chain is located on the inner side of the wall 34 and/or the stiffening rim 129.

In the embodiment shown in FIG. 39 the connection between the wall 34 and the stiffening rim 129 is omitted near the lower sides of both of them over a given height and along the whole circumference. The height where the stiffening rim 129 and the wall 34 are not connected with one another is about 40 percent of the height of the stiffening rim 129. Between these loose, uninterrupted strips of the lower part of the lower wall 34 and of the stiffening rim 129 are inserted the ends of a folded strip of a wear-resistant material in the form of an uninterrupted hose 202. The ends are clamped tight, for example by bolts, between the adjacent lower ends of the wall 34 and the stiffening rim 129. The hose 202 holds a chain, for example, an endless chain 203. The chains shown in FIGS. 37, 38 and 39 are interchangeable and may have different weights per unit of length (for example ¼ inch or ⅜ inch links). By providing an opening in the hose 202 at one place the chain 202 can be withdrawn from the hose 202 without removing the latter (when the chain is not an endless chain), after which the chain may be replaced by another chain of smaller or larger weight per unit length.

In the embodiment shown in FIG. 40 the hose 202 is arranged in the same manner between the loose lower strips of the wall 34 and the stiffening rim 129 as in the embodiment shown in FIG. 39. The hose 202 in the embodiment shown in FIG. 40 is provided at one or more places with filling caps 204 near the top side of the hose 202. By means of these filling caps 204 the hose 202 may be filled wholly or partly with a fluid, for example, water.

It should be noted that the hose 202 enclosing the chain 203 shown in FIG. 39 is located below the lower edge of the wall 34 and of the stiffening rim 129. As a matter of course the hose 202 with the chain 203 may be fastened to the inner side of the stiffening rim 129 (FIG. 41) or on the outer side of the wall 34 so that the lower side of the hose 202 and thus also the lower side of the chain 203 are located at the level of the lower sides of the wall 34 and the rim 129. The hose 202 with or without fluid shown in FIG. 40 may also be fastened to the inner side of the rim 129 (FIG. 42) or to the other side of the wall 34 so that the lower side of the hose 202 is located at the level of the lower side of the wall 34 or the rim 129.

Figure 43:
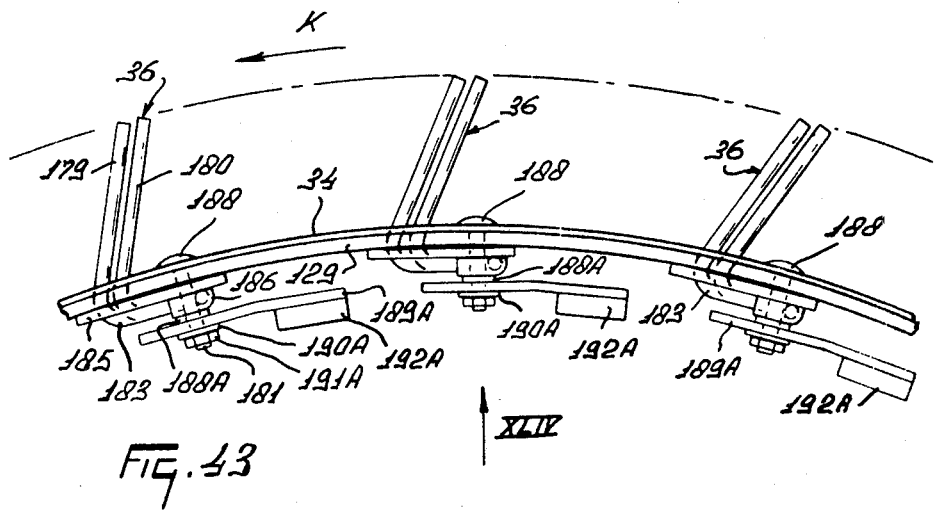
FIG. 43 is a plan view and a sectional view at right angles to the rotary axis of part of the flexible wall in a further embodiment, viewed parallel to the axis of rotation.

In the embodiment shown in FIG. 43 a circlip 188 slipped onto the bolt 181 is in contact with the tangential inner surface of the clamping piece 186. An arm 189A exerts pressure on the circlip 188A and is passed through an elongated hole of the bolt 181 and is clamped tight to the end of the bolt 181 facing the rotary shaft 19 with the aid of a circlip 190A and a nut 191A.

The arm 189A has the shape of a strip and extends to the rear away from the bolt 181, viewed in the direction of rotation K. The arm 189A (see the elevation of FIG. 43) is slightly bent over midway its length towards the rotary shaft 19 so that the arm 189A is spaced apart from the wall 34. The length of the arm 189A, measured along the circumference of the rake member, is about 60 to 90 percent, preferably about 75 percent of the distance between two consecutive bolts 181A, but in the case of a stronger inward bend of the arm 189A this length may be considerably greater. A weight 192A is fastened to the side of the arm 189A facing the rotary shaft 19 near the end of the arm remote from the bolt 181. The elongated hole in the arm 189A covers substantially the whole length of the arm 189A (FIG. 44) from the end of the arm 189A remote from the poise 192A to near the poise 192A. The poise 192A may be welded to the arm 189A, but it may be arranged in a detachable manner so that, if desired, a different weight can be provided. Since the groups of tines 36 and the associated tine holders are vigorously urged outwardly by centrifugal force and are pressed away in a tangential sense and turned away by the forces exerted by the crop, the tine connection may exert at some places concentrated forces on the flexible material so that tear or rupture of the flexible material might be initiated. The stiffening rim 129 also serves to absorb said local concentration of forces and by using a given thickness and rigidity of the material of the rim 129 the foldability of the lower edge may be adapted to given operational conditions.

It appears that for working certain kinds of crop the foldability of the assembly of the wall 34 and the stiffening rim 129 is satisfactory, but it may be desirable to have a control on other factors, for example, the centrifugal force. When the machine has to displace fairly heavy crop, the wall 34 may exhibit a curvature in a vertical sense at the front of the rake member so that the lower edge of the wall 34 and hence also the stiffening rim 129 might be inclined inwardly. Under certain conditions the crop engaged by the groups of tines 36 and the lower edge of the wall 34 may get beneath the lower edge of the wall 34 so that it is carried along by the inwardly inclined lower edge over an excessive distance. When the centrifugal force at the area of the lower portions of the wall 34 and the stiffening rim 129 is increased, said phenomenon may be avoided, while the crop can be released at sufficiently early instant for depositing it in the form of a swath or for spreading it uniformly over a large circumferential angle. In the embodiments shown in FIGS. 28 and 29 this increase in centrifugal force in the area of the lower edge of the flexible wall is obtained by the mass of the plates 185 at the tine holders. By an appropriate choice of the weight of said plates, said phenomenon is eliminated. The dimensions of said masses do not exceed those of the tine holders so that the foldability of the wall is not adversely affected.

It should be noted that the lower edges of the plates 185 may also serve as wear-resistant rims. These lower edges may be arranged so that they slightly project below the lower edge of the stiffening rim 129 and the wall 34. In the embodiment shown in FIGS. 30 and 31 the masses (weights 189) increasing the centrifugal force locally are arranged in between two adjacent groups of tines 36. The weights 189 may be replaced by weights having a smaller or greater weight so that the rake member can be adapted to the working conditions or the kind of crop. Also in this case the lower edges of the weights 189 may slightly project beneath the lower edge of the stiffening rim 129 in order to serve as a wear-resistant rim. As a matter of course, the embodiments shown in FIGS. 28 and 29 may be combined with those of FIGS. 30 and 31. In these embodiments the flexibility of the lower part of the rake member 17 is maintained, while in operation, the lower edge of the rake member maintains its circular shape and the centrifugal forces exerted on the comparatively light structure of the flexible wall 34 and the rim 129 are variable.

In the embodiment shown in FIGS. 32 and 33 it is possible to replace rapidly the weights 194 by larger or smaller weights in accordance with circumstances. The weights 194 may be proportioned so that the lower edges project beneath the lower edge of the wall 34 and serves as a wear-resistant rim. In this case the poises need not be replaced by removing the bolts 190 as in the embodiments of FIGS. 30 and 31, but the poises may be simply unhooked and the new set of poises can be hooked on by inserting the brackets into the openings between the wall 34 and the stiffening rim 129.

FIGS. 34 and 35 show also a ready possibility of interchange in that the flaps 197 of the pockets 196 can be opened, the inserted weight can be removed and the new weight can be inserted again, after which the flap can be closed by the button 198. This embodiment may, of course, be combined with that shown in FIGS. 28 and 29. If the working conditions vary only little, the embodiment shown in FIG. 36 may be employed, in which the centrifugal force near the lower edge of the wall 34 is increased by means of the lead wire 199 inserted into the seam. Also, this lead wire can be removed and replaced by a lead wire having a different weight per unit of length.

The chain 200 used in the embodiment shown in FIGS. 37 and 38 also constitutes a mass at the lower edge for increasing the centrifugal force, while the flexibility of the wall, the basic principle of this concept is maintained. The chain 200 may be replaced by another chain having a different weight per unit of length by removing the nuts 187, after which the suspension plates 201 of the new chain can be slipped onto the bolts 181 and be secured in place by the nuts 187. The lower edge of the chain, which may project beyond the lower edge of the wall 34, again forms a wear-resistant rim. The chain 203 shown in FIG. 39 can be very rapidly replaced by a chain having a different weight per unit of length, since the hose 202 has an opening through which the first chain can be withdrawn and the new one be inserted. This also applies when the hose 202 is arrangedon on the inner side of the stiffening rim 129 so that the lower edge of the hose is located at the level of the lower edge of the wall 34 (FIG. 41). The embodiment shown in FIG. 40 permits a simple and very fast change of the weight per unit of length along the lower edge of the wall 34, which may be arranged inside the stiffening rim 129 and above the lower edge of the wall 34 (FIG. 42). By providing a second falling cap (not shown) near the lower side of the hose 202 in FIG. 40 the hose 202 can be simply emptied and for increasing the weight per unit of length, while maintaining the flexibility at the lower edge can be obtained by pouring fluid through the filling cap 204. It is furthermore possible to fill the hose 202 partially with a different substance, for example, sand.

Figure 44:
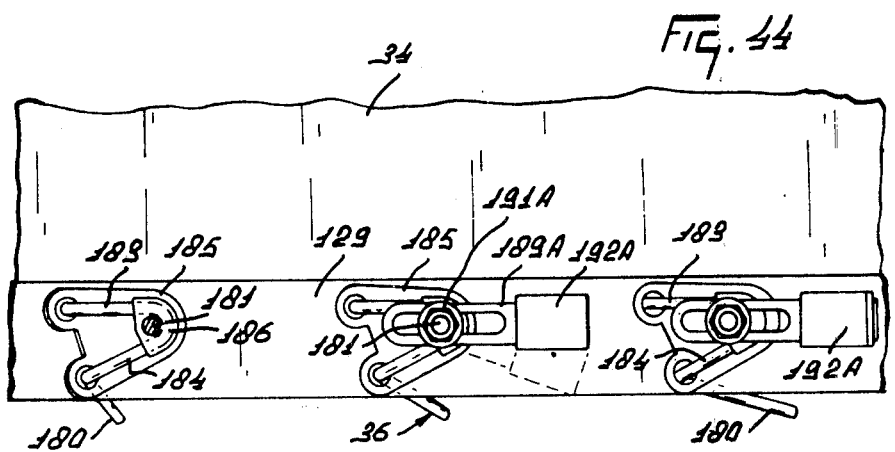
FIG. 44 is an elevation in a radial direction of the inner side of the wall taken in the direction of the arrow XLIV in FIG. 43.

Since in the embodiment shown in FIGS. 43 and 44 the distance of the center of gravity of the mass of the poise 192A from the bolt 181 can be adjusted in a tangential direction, a correct compensation of the forces exerted by the crop can be obtained in dependence upon the weight of the crop. The circlip 188A ensures that the arm 189 remains in its selected state, while a rapid adjustment by means of the nut 191A can be achieved. It should be noted that it is very important for the mass of the plate 185 near the holes from which the tines 179 and 180 emerge to be minimized, since then the mass of the poise 192A can then be reduced proportionally. This favorably affects the centrifugal force exerted on the flexible wall 34.

The weight 192A not only serves to put the tines 179 and 180 into the correct position relative to the direction of rotation K, the tines then matching the crop by shifting the arm 189A in a tangential sense, but also permits obviating curvatures of the wall 34 in a vertical sense and the consequent unfavorable tine positions by the axial displacement of the weight 192A. When the machine displaces comparatively heavy crop, the wall 34 may be bent inwardly near the lower edge at the front of the rake member. Under certain conditions the crop engaged by the groups of tines 36 and the lower edge of the wall 34 may then get beneath the lower edge of the wall 34 and is carried along by this inwardly inclined lower edge over an excessive distance. This phenomenon can be avoided by shifting the poise 192A downwardly in an axial direction so that the mass of the weight 192A exerts, in operation, a compensating centrifugal force on the inward pressure produced by the crop and the speed of movement of the machine.

By slightly bending inwardly towards the rotary shaft 19 the arms 189A may be fairly long without adversely affecting the flexibility of the wall and without the risk of damage to the wall.

Figure 45:
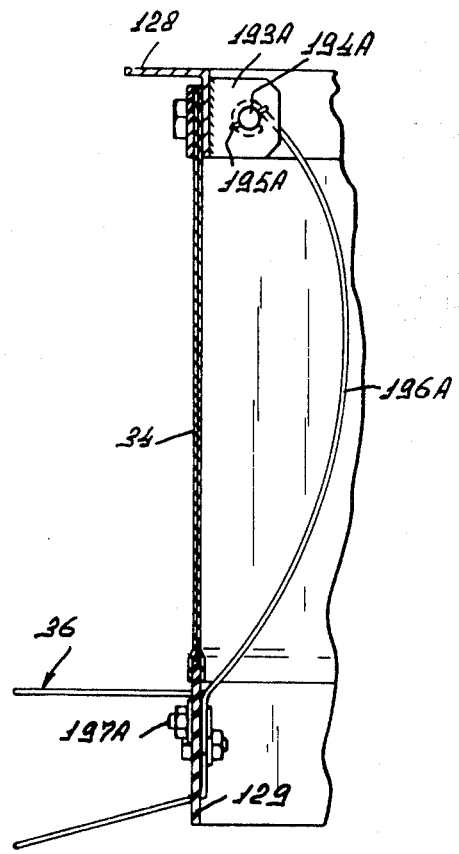
FIG. 45 is a sectional view in a radial direction of the flexible wall in a further embodiment.

In the embodiment shown in FIG. 45 a fork-like extension arm 193A is fastened to the part of the felly 128 facing the rotary shaft 19 (FIG. 17), the prongs of which fork extend parallel to the radial plane of symmetry going through the extension arm. Through holes in the extension arm 193A is passed a pivotal shaft 194A, the center line of which crosses the rotary shaft 19 at right angles, said pivotal shaft 194A extending in a tangential direction. The pivotal shaft 194A is secured in place on either side of the extension arm 193A by means of safety pins 195A. The pivotal shaft 194A is surrounded by a few turns of a spring steel strip 196A, which forms part of the surface of a cylinder, the center line of which is located on the outer side of the wall 34 and crosses the rotary shaft 19 at least substantially at right angles. The strip 196A is proportioned so that deformation is possible in a radial and an axial sense but this is not hardly possible in a tangential sense. Near the lower side of the rake member the strip 196A is clamped tight by a bolt 197A to the stiffening rim 129. The place of fastening of the strip 196A on the stiffening rim 129 is located between the fastening areas of two adjacent groups of tines 36. Said place is located on the circumference of the rake member so that the plane of symmetry going through the strip is going in addition through the bisector of the angle between two adjacent spokes 33. Said plane of symmetry coincides with the corresponding radial plane. It will be obvious that the strip 196A may also be arranged in place in the taut state so that the wall is, to some extent, pre-stressed in the axial direction.

Figure 46:
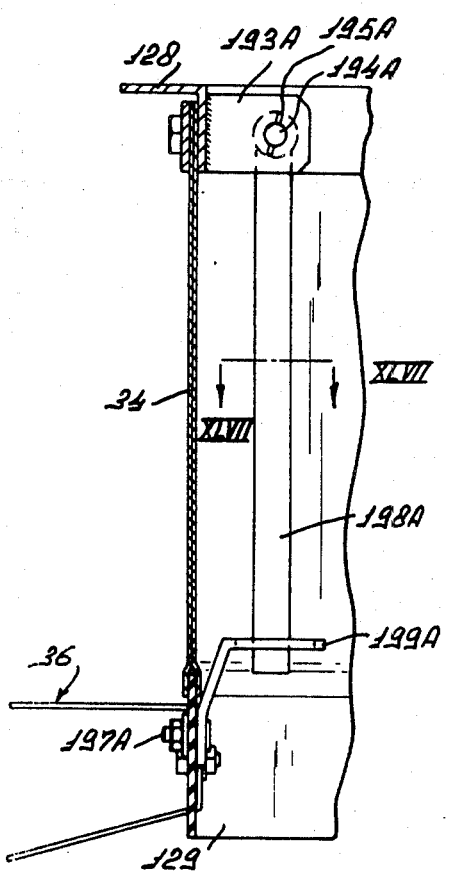
Figure 47:
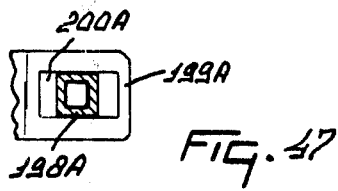
FIG. 47 is a sectional view and partly an elevation taken on the lines XLVII—XLVII in FIG. 46.

In the embodiment shown in FIG. 46 the extension arm 193A is also provided with a pivotal shaft 194A, which is connected with a rod 198A of at least substantially square section, (FIG. 47). This rod extends at least substantially in an axial direction, but it may also be parallel to the surface of a cone, the apex of which is located on the rotary axis above the rake member. The end of the rod 198A remote from the axis pivotal shaft 194A is pssed through a plate-shaped guide 199A extending parallel to a plane at right angles to the rotary shaft 19 at a level corresponding at least substantially to the transitional area between the wall 34 and the stiffening rim 129, the rod then bending over in an at least substantially tangential direction, where the guide 199A is fastened in the manner shown in FIG. 45 by means of a bolt 197A to the inner side of the stiffening rim 129, the place of fastening of the guide corresponding at least approximately with the place of fastening in FIG. 45. The guide 199A comprises a guide slot 200A, which receives the rod in a tangential direction and which provides some amount of play to the rod 198A in a radial direction (FIG. 47).

The embodiment shown in FIG. 48 comprises a fork-like extension arm 201A, the prongs of which are inclined downwardly away from the felly 128 towards the rotary shaft 19, a plane going through the top sides of said prongs being at an angle of about 15° to a plane at right angles to the rotary shaft. The extension arm, lie the extension arm 193A of FIG. 45, is provided near one end with the pivotal shaft 194A. The tangential pivotal shaft 194A is connected with a tube or rod 202 of at least substantially square section, which is hollow over at least approximately its whole length, the free end receiving telescopically a rod-shaped member 203A, which is slidable inside the rod 202A so that the overall length of the parts 202A and 203A is variable. The parts 202 and 203A are usually made of steel like the rod 198A, but they may also be made of a light metal or a synthetic resin. The parts 202A and 203A are parallel to the surface of a cone, the apex of which is located on the axis of rotation above the rake member. The end of the part 203A remote from the pivotal shaft 194A is connected with a tangential pivotal shaft 204A located in an extension arm 205, which is fastened by means of a bolt 206 to the inner side of the stiffening rim 129. The part 202 encloses the part 203A in a tangential direction so that the assembly of the parts 202 and 203A is not or hardly movable in a tangential direction.

The embodiment shown in FIG. 49, like that of FIG. 45, comprises an extension arm 193A holding the tangential pivotal shaft 194A. The pivotal shaft 194A has fastened to it a rod- or plate-shaped part 207, which is inclined downwardly towards the rotary shaft 19 over a given distance and terminates in an extension arm or fork 208, through which the pivotal shaft 209 is taken, the center line of which is parallel to the center line of the pivotal shaft 194A. The pivotal shaft 209 is located on either side of the fork 208 and is held in place by means of locking pins 210. From the pivotal shaft 209 a plate-or rodshaped part 211 extends downwardly in a direction at least substantially equal to that of the assembly of the parts 202A and 203A of FIG. 48. The upward turn of the parts 207 and 211 is restricted by a plate 212 forming a stop so that the smallest angle between the parts 207 and 211 is at least approximately 45°. The part 211 is fastened near the lower side of the rake member to the stiffening rim 129 in the manner shown in FIG. 45 by means of a bolt 213. When the wall 34 is taut, the angle between the parts 207 and 211 is at least substantially 90°.

Like the embodiment shown in FIG. 49 the embodiment of FIG. 50 comprises relatively pivotable parts 207 and 211, their movements being restricted by the plate 212 forming a stop. The part 211 is fastened near the end remote from the pivotal shaft 209 to the pivotal shaft 204A of FIG. 48, which extends in a tangential direction and is passed through the extension arm 205, which is fastened by means of the bolt 206 to the stiffening rim 129. It should be noted that the constructions shown in FIGS. 46 to 50 like that shown in FIG. 45 have a plane of symmetry which coincides with the corresponding radial plane.

In operation, the stiffening rim 129 is urged away in a tangential sense against the direction of rotation K by the torques produced at the front of the rake members by the forces exerted by the crop on the groups of tines 36 so that the rim 129 slightly "lags behind" with respect to the wall 34. This phenomenon of tangential deformation becomes the more manifest the longer and heavier the crop and the higher is the travelling speed. This "lagging behind" of the lower side of the combined wall 34 and rim 129 results in folds and curvatures of the wall in a vertical sense so that the lower side of the rim 129 loses its contact with the ground and crop gets beneath the rake member and is thus released prematurely in an undesirable manner. When the tangential deformation of the wall 34 and the rim 219 can be avoided, it appears that the aforesaid phenomena will no longer occur. In the embodiment shown in FIG. 45 the required rigidity in a tangential sense is obtained by providing the comparatively broad spring steel strip 196A, which is fastened on the one hand near the rim 129 and on the other hand is pivotable; about a tangential pivotal shaft 194A near the felly 128. This structure satisfactorily absorbs the tangential forces exerted on the wall 34 and the rim 129 so that its serves as a control-mechanism for the wall. The required flexibility of the outersurface in a radial and an axial sense, required for a satisfactory operation of the rake member, is maintained, the more so since the strip itself is made of slightly flexible material (spring steel), while the strip is capable of turning at its top side. A further favorable effect of the structure is that under the action of centrifugal forces the strip 196A to some extent stretches the wall 34 so that the undesirable curvatures in a vertical sense are counteracted.

In the embodiments in FIGS. 46 and 47 the required rigidity in a tangential sense is obtained with the aid of the rod-shaped part 198A, which is axially displaceable near its lower side in a guide plate 199A, which is fastened to the rim 129, while the rod 198A can turn at its top side like the strip 196A of FIG. 45. The rod 198A is slidable in a guide slot 200A in the guide 199A so that the rod 198A can move only in an axial and a radial sense. The structure shown in FIG. 46 can provide a better deformation of the wall 34 in an axial sense than the spring steel strip 196 of FIG. 45, while the wall 34 is at the same time stretched in an axial direction.

The embodiment shown in FIG. 48 comprises telescopically slidable parts 202A and 203A extending upwardly in a tangential direction and being inclined towards the rotary shaft 19, while the parts 202 and 203A are pivotally connected by means of tangential pivotal shafts to the felly 128 and the rim 129 respectively. The structure shown in FIG. 48 provides apart from the advantages of the embodiments shown in FIGS. 45 to 47, the maximum preservation of the flexibility of the wall 34 in an axial and a radial sense. The material of the parts 202A and 203A is similar to that of the rod 198A of FIG. 46.

FIG. 49 shows a structure which provides the required rigidity in a tangential sense and a maximum flexibility of the wall 34 in an axial and a radial sense. The parts 207 and 211 may have the shape of plates or rods and they are pivotable relative to one another and to the felly 128 about tangential pivotal shafts 194A and 209, while the part 211 is rigidly secured to the rim 129. The part 211 has the same direction relative to the rotary shaft 19 as the parts 202A and 203A in FIG. 48. The parts 207 and 211 may be made of steel, light metal or synthetic resin. The shape of the triangle formed by the wall 34, the part 207 and the part 211 (FIG. 49) has appeared to be very important. In operation, when the wall 34 is stretched taut, the optimum angle between the parts 207 and 211 is at least approximately 90°. In order to avoid an excessive upward turn of the parts 207 and 211 during axial and radial deformations of the wall 34, a plate 212 forming a stop is provided between the parts 207 and 211. The plate 212 ensures that the smallest angle between the parts 207 and 211 is at least approximately 45°. The shape of the triangle described above ensures not only an advantageous flexibility of the wall but also a stretching effect in a vertical sense under the action of the centrifugal force exerted on the triangle.

The embodiment shown in FIG. 50 comprises the parts 207 and 211 like the structure of FIG. 49. The part 211 is pivotally fastened near its lower side to the rim 129 as in FIG. 48. The advantage of this pivotable connection is that during the movements of the parts 207 and 211 the groups of tines 36 remain freely movable in an axial sense. It is thus prevented that the lower tine should penetrate into the soil during an unfavorable movement of the part 211.

It should be noted that all embodiments shown in FIGS. 45 to 55 operate as wall stabilizers or wall stabilizing means and that these rake members allow working of heavy crops, while a comparatively high speed of travel is permitted.

Although it is stated above that the support or spoke 33 is resilient or flexible, it may be formed by a rigid, tubular support, which is rigidly secured to the hub of the rake member as in the embodiments shown in FIGS. 51 to 55.

In the embodiment shown in FIG. 51 a tangential plate 214 is arranged near the end of the tubular spoke 33 remote from the hub. The plate 214, viewed in a radial direction, has the shape of an isosceles triangle, one side of which is at least substantially parallel to the rotary shaft 19 and is located behind the spoke 33, viewed in the direction of rotation of the rake member. Near the corners of this side two strip-shaped extension arms 215 and 216 are pivotally journalled and directed tangentially in a horizontal direction against the direction of rotation J or K. They extend to the rear and are located at a distance one above the other. Near the two ends of the extension arms 215 and 216 remote from the plate 214 a spring steel strip 217 is pivotally journalled and extends in an axial direction (FIG. 51), while the broad side of a sectional area at right angles to the rotary shaft 19 extends in a tangential direction. The strip 217 is fastened by means of a bolt near its lower end to the inner side of a circular flexible stiffening rim 129 on the inner side of the wall 34, with which it is integral. The strip 217 is pivotable with respect to the extension arms 215 and 216 by means of approximately radial pivotal shafts, which, viewed in a radial direction, are located together with the two pivotal shafts, about which the extension arms 215 and 216 are pivotable with respect to the plate 214, at the corners of a parallelogram.

In operation, the forces exerted by the crop on the wall 34 and the groups of tines 36 and the forces resulting from the ground contact of the lower side of the wall, said forces tending to push away tangentially the lower side of the wall with respect to the top side thereof (which would result at the same time in an upward movement of the lower side of the wall) are absorbed by the strip 127 and the extension arms 215 and 216 which operate in common as a control-mechanism for the wall. The strip 217 is rigid in a tangential direction and is at least substantially immovably connected with the rigid spoke 33. Since the wall 34 has to be capable of absorbing by deformation transient forces in an axial and a radial direction, said control-mechanism is constructed so that wall deformations may occur in the last-mentioned directions, since the strip 217 is movable in an axial and a radial direction owing to its resilient property in the axial direction and to the upwardly movable connection with the spoke 33. When moving in upward direction or an axial direction the combination of the plate 214, the extension arms 215 and 216 and the strip 217 operates as a parallelogram mechanism, in which the direction of the strip 217 relative to the rotary shaft remains unchanged. Owing to the rigidity of the strip 217 in a tangential sense the tangential rigidity of the wall is maintained during the upward movements of said strip so that the wall 34 will not "wind up" near the lower side of the occurrence of the tangential forces. Owing to its flat arrangement with respect to the wall 34 the control-mechanism of the wall is in practice substantially not subject to soiling. It should be noted that it is also possible to enclose the assembly in a hood so that soiling is completely excluded.

In the embodiment shown in FIG. 53 a spring steel rod 218 is pivotable near one end about a radial shaft 219, which is fastened to the inner side of the felly 128, whereas near its lower end the rod 218 is pivotable about a radial shaft 220 arranged on the stiffening rim 129. The distance between the shafts 219 and 220, measured in a tangential direction, is about 50 percent of the height of the wall. The shaft 220 is located, viewed in the direction of rotation C or K, after the shaft 219, but the shaft 220 may also be arranged in front of the shaft 219 (see the direction of rotation K in FIG. 53).

In operation, the forces exerted in a tangential direction by the crop and the friction on the ground (which forces tend to deform the wall in a tangential sense resulting, as stated above, in an upward displacement of the lower side of the wall) are absorbed by the rod 218, which serves in this embodiment as a controlmechanism for the wall. When the wall 34 rotates in the direction C or K, that is to say when the rod 218 extends downwardly and rearwardly viewed in this direction of rotation, the lower side of the wall may nevertheless slightly lag behind due to the pivotable arrangement of the rod 218, but since strong folding of the wall is avoided, this deformation of the wall may be permissible under given conditions. When the wall 34 rotates in the direction P (FIG. 53), that is to say, when the rod extends forwardly viewed in the direction of rotation, the end of the rod located near the shaft 220 tends to move downwardly and rearwardly relative to the direction of rotation P so that the rod 218 is exposed to pressure while the wall itself is slightly stretched in an axial direction. In this way a tangential deformation of the lower side of the wall with respect to the top side thereof will not occur.

In the embodiment shown in FIG. 54 a bracket 221 is fastened to the rigid rod 33 rigidly secured to the hub, said bracket projecting beneath the lower side of the spoke 33, where it holds a tangential bearing sleeve 223. The bearing sleeve 223 is located at a comparatively short distance from the flexible wall 34 as compared with the radius of the rake member. The bearing sleeve 223 holds a pivotable arm 224. A portion of the arm 224 is located inside the bearing sleeve 223 and thus extends in a tangential direction and crosses the rotary shaft 19 at right angles. Away from said portion 225 the arm 224 is bent over outside the bearing sleeve 223 through about 90° in a radial direction to the outside and forms the portion 226. The outermost end of the portion 226 is bent downwards through a small angle of, for example, 15° and welded to a fork 227 comprising two relative parallel side plates 228 and 229, which are approximately parallel to a plane going through the rotary shaft 19. The side plates 228 and 229 of the fork 227 have each a bore, the two bores registering with each other and the center lines extending tangentially and parallel to the center line of the portion 225 of the arm 224. Through said bores is passed a pivotal shaft 230, which extends tangentially and crosses the rotary shaft 19 at right angles. A strip 231 is secured thereto so as to be pivotable about the pivotal shaft 230. Said strip extends downwardly away from the pivotal shaft 230 and in the sectional view of FIG. 54 it is at a very small angle, for example, of about 10° to the vertical. The pivotal shaft 230 is located, viewed in an axial direction, near the lower side of the rigid felly 128 near the spoke 33, to which the flexible wall 34 is fastened. The strip 231 is fastened near its lower side by means of a bolt 232 to a slightly rigid, but flexible part 233, which is arranged on the lower side of the flexible wall 34. The lower side of the part 233 is, in operation, frequently in contact with the ground and serves at the same time as a flexible connection for the groups of tines 36. The bolt 232 extends in a radial direction. The strip 231 has a rectangular sectional area, the larger dimension of which extends in a tangential direction so that the strip 231 may be considered to be rigid in a tangential direction. On that side of the bearing sleeve 223 which is remote from the portion 226 of the arm 224, near the end of the portion 255 a lever 234 in the shape of a rod extends at right angles to the center line of the portion 225 so that its direction of length is at least substantially parallel to a plane going through the rotary shaft. The lever 234 has a plurality of holes 235 spaced apart from the center line of the portion 225 by different distances. By means of a pin 236 inserted into one of the holes 235 (FIG. 55) a spring 237 can be coupled with the lever 234, the end remote from the pin 236 of said spring being fastened in a manner not shown, for example, to a point of the felly 128. The axis of the helical spring 237 may be at an angle of about 10° to 60° to a plane at right angles to the right shaft 19. The tension of the spring 237 can be varied by inserting the pin 236 into a different hole 235 of the lever 234. The spring 237 is intended to serve an auxiliary means and may form a complementary structural part. Viewed in an axial direction the pivotal shaft 230 is located approximately at the same level as the center line of the bearing bushing 223 or it is located slightly lower. The structure of the arm 224, the fork 227 and the strip 231 is provided near each spoke 33.

In operation, as stated above, the forces exerted by the crop in a tangential direction and the forces exerted by the ground also in a tangential direction on the lower side of the wall 34 tend to shift the lower side of the wall in a tangential direction with respect to the top edge of the wall, which might give rise to undesirable upward displacements of the lower side with respect to the top side. It appears to be important for means preventing such a deformation to be constructed so that the further degrees of freedom of the wall, that is to say, the movability of the lower side of the wall with respect to the hub of the rake member in a radial and an axial direction are affected not at all or as least as possible. Like in the two preceding embodiments it is important to prevent an axial stretching of the wall 34, which might partly restrict or even prevent the deformability in the upward direction of the lower side of the wall. A very slight pre-tension of the wall in an axial direction need not be harmful, but a fairly high pre-tension in an axial direction has to be avoided.

Also, in the embodiment shown in FIGS. 54 and 55, an axial pre-tension of the wall 34 does not occur or hardly occurs. The center of gravity of the means for controlling the wall deformation, that is to say, the arm 234, the fork 227 and the strip 231 is located, viewed in an axial direction, at the level of the center line of the bearing bushing 223. Since the center of gravity of said mass is located at said place and in the embodiment shown in FIGS. 54 and 55 even at a slightly lower level than the bearing bush, the wall 34 will be exposed to no force or even to a slightly upwardly directed force due to the centrifugal force at the center of gravity of said mass, said force being introduced through the bolts 232. Since in the embodiment of FIGS. 54 and 55 a slight upward force on the lower side of the wall 34 is a starting point, the spring 237 may have a regulating effect on said axial force in the wall 34. By varying the tension of the spring 237 and/or by varying the direction of the axis of the helical spring the axial force in the wall 34 may be reduced to zero or even, if desired, a slight axial stretching force may be introduced into the wall 34. Since the arm 224 is not pivotable with respect to the hub of the rake member by means of the bearing bushing 223 and the strip 231 itself is rigid in a tangential direction and is rigidly held in this direction with respect to the arm 224, it is prevented that the lower edge 233 of the wall 34 shifts in a tangential direction or move upwards in said undesirable manner with respect to the felly 128.

It will be obvious that this construction may also be employed when the rake members are rotating in opposite directions. Even when the machine is travelling across depressions of the ground so that the rear side of the wall 34 (viewed in the direction of travel) could come into contact with the ground surface, an abrupt shock in upward direction can be absorbed by the pivotal movement of the arm 224 in the bearing bushing 223. Owing to the pivotability of the strip 231 around the pivotal shaft 230 a deformation of the lower side of the wall 34 in a radial sense as well as a deformation in an axial sense by the turn about the center line of the bearing bushing 223 are possible without the need for further means.

What is claimed is:

1. A rake machine for displacing crop on the ground comprising a frame and at least one rake member supported on said frame, said member being rotatable about an upwardly extending axis, said member having an outer circumference and said circumference being formed by a deformable wall, means on said member for restricting the amount of deformation of at least the lower portion of said wall, crop working means being supported on said wall.

2. A machine as claimed in claim 1, wherein said means is operatively associated with said wall to restrict the deformation at least of the lower portion of the wall in an axial direction.

3. A machine as claimed in claim 1, wherein said means is operatively associated with said wall to restrict the deformation of at least the lower portion of the wall in a radial direction.

4. A machine as claimed in claim 1, wherein said means is operatively associated with said wall to restrict the deformation of at least the lower portion of the wall in a tangential direction.

5. A machine as claimed in claim 1, wherein said wall is composed of flexible material that is generally circular in configuration when viewed in plan.

6. A machine as claimed in claim 5, wherein said wall is comprised of canvas, rubber or synthetic resin material.

7. A machine as claimed in claim 5, wherein said wall is cylindrical during rotation of said rake member.

8. A machine as claimed in claim 7, wherein the lower portion of the wall extends to the ground during operation.

9. A machine as claimed in claim 5, wherein said wall is suspended from a rigid, circular felly by at least one flexible connecting element and sand felly is connected to a central hub, each connecting element being rigidly secured in place with respect to said hub and said felly.

10. A machine as claimed in claim 9, wherein the connecting element extends at least partly in a tangential direction and is operatively associated with the wall to restrict the amount of deformation of same.

11. A machine as claimed in claim 1, wherein the restriction means for restricting the deformation of said wall extends along part of the surface of said wall.

12. A machine as claimed in claim 11, wherein said control means is located along at least part of the lower half portion of the inner side of said wall.

13. A machine as claimed in claim 1, wherein said wall is reinforced by a circular strip having relatively lower elasticity than the material of said wall.

14. A machine as claimed in claim 1, wherein the means for restricting the deformation of said wall comprises spring means and said spring means is secured to said rake member to bias said wall to a normal circular configuration.

15. A machine as claimed in claim 1, wherein an adjusting device is associated with said means for restricting wall deformation.

16. A machine as claimed in claim 1, wherein said wall is stiffened by a plurality of resilient strip-shaped elements extending in an axial direction and interconnecting the top and bottom of said wall, said elements being located around the circumference of the wall and the latter being supported on a circular felly secured to said rake member by spoke means, said elements being rigidly secured to the felly.

17. A rake machine for displacing crop on the ground comprising a frame and at least one rake member supported on said frame, said member being rotatable about an upwardly extending axis, said member having an outer circumference and said circumference being formed by a flexible wall, restricting means on said member for restricting the amount of deformation of said wall and biasing said wall to a generally cylindrical configuration, said restricting means including an adjusting feature associated with said restricting means, whereby the degree of bias exerted by said control means on said wall can be changed, crop engaging means being connected to said wall.

18. A machine as claimed in claim 17, wherein said restriction means has a part that bears on the lower portion of the said wall.

19. A machine as claimed in claim 18, wherein, viewed in a direction parallel to the axis of rotation of said member, said part extends tangentially to said wall.

20. A machine as claimed in claim 19, wherein the extent of restriction of the wall deformation exerted by said restricting means can be regulated in at least one path along an axial, radial or tangential direction.

21. A machine as claimed in claim 19, wherein said restricting means is shaped as a spring and includes a weight.

22. A machine as claimed in claim 17, wherein, in operation, said wall can be stretched by said restricting means under the influence of centrifugal force.

23. A machine as claimed in claim 17, wherein said wall has an outer surface provided with tine group projections.

24. A machine as claimed in claim 17, wherein said restricting means includes separate weights located around the periphery of said wall.

25. A machine as claimed in claim 17, wherein said restricting means comprises a plurality of flexibly linked parks secured around at least a portion of the periphery of said wall.

26. A machine as claimed in claim 25, wherein said control means includes separate parts and said parts together with tine groups are fastened around the periphery of the lower portion of said wall.

27. A machine as claimed in claim 26, wherein said parts are fastened to the wall in between two adjacent groups of tines.

28. A machine as claimed in claim 27, wherein said parts are detachable from said wall and have the same weight, said parts being replaceable by a different set of parts of different weight.

29. A machine as claimed in claim 28, wherein said parts are weight masses and holders for said masses are mounted on the outer periphery of said wall.

30. A machine as claimed in claim 26, wherein said restricting means is a continuous element that extends around the entire circumference of said wall.

31. A machine as claimed in claim 30, wherein said element is a chain and a flexible, hose-like member located adjacent the lower edge of said wall receives said chain.

32. A machine as claimed in claim 30, wherein said element is a hose that contains a fluid.

33. A machine as claimed in claim 17, wherein tines on connections to said wall are associated with weights of said restricting means and said weights are adjustable in at least one direction.

34. A machine as claimed in claim 33, wherein said weights are pivotally supported on respective shafts on said wall, said control means being turnable about shaft means that is substantially tangential with respect to said wall and said shaft means being located adjacent the top of said wall.

35. A machine as claimed in claim 17, wherein said restricting means comprises outer parts that extend at least substantially along the entire height of the wall and are fastened to the lower portion of said wall.

36. A machine as claimed in claim 35, wherein said wall is stretched in an axial direction by said restricting means under the influence of centrifugal force.

37. A machine as claimed in claim 17, wherein said restricting means comprises parts connected to spoke means and the latter is secured to a central hub of said rake member.

38. A machine as claimed in claim 37, wherein a displaceable rod of said control means is interconnected to said wall and said rod is movable with respect to the hub through a pivotable parallelogram structure of said control means, said control means comprising at least one rod extending approximately in an axial direction relative to said axis of rotation, said rod being rigid in a tangential direction and displaceable in a direction parallel to said spoke means.

39. A machine as claimed in claim 38, wherein said rod is elastically deformable in a radial direction.

40. A machine as claimed in claim 39, wherein the top end of said rod is pivoted to an arm by a pivotal shaft to form a pivoted rod and arm assembly, and said arm is connected with said rod to be pivotable about a hinge shaft that extends in a tangential direction, said hinge shaft being supported on bracket means, the center of gravity of said assembly being located approximately at the level of said hinge shaft, and the distance between the hinge shaft and the axis of rotation of said rake member being smaller than the distance between the pivotal shaft and said axis of rotation, said arm being associated with a spring that biases said rod down, said spring being adjustably connected to said control means.

41. A machine as claimed in claim 17, wherein said restricting means comprises at least one rod which extends along said wall and is directly coupled with same adjacent its top and bottom, said rod extending at an angle to a plane at right angles to said axis of rotation.

42. A machine as claimed in claim 41, wherein the lower end of said rod is located behind the top end of said rod with respect to the normal direction of rotation of said rake member.

43. A machine as claimed in claim 41, wherein the lower end of said rod is located in front of the top end of said rod with respect to the normal direction of rotation of said rake member.

44. A machine as claimed in claim 17, wherein said control means includes a plurality of arm assemblies and each assembly comprises at least two rod-like parts, which are pivoted to one another to turn about at least one tangential pivotal axis, the relative turns of said two parts being restricted by a stop on said control means, said assemblies being connected to a lower stiffened portion of said wall.

* * * * *